US010882772B1

(12) United States Patent
Wensel

(10) Patent No.: US 10,882,772 B1
(45) Date of Patent: Jan. 5, 2021

(54) STORMWATER COLLECTION, TREATMENT, AND AQUIFER REPLENISHMENT INSTALLATIONS AND METHODS

(71) Applicant: Daniel L. Wensel, Scottsdale, AZ (US)

(72) Inventor: Daniel L. Wensel, Scottsdale, AZ (US)

( * ) Notice: Subject to any disclaimer, the term of this patent is extended or adjusted under 35 U.S.C. 154(b) by 0 days.

(21) Appl. No.: 16/374,094

(22) Filed: Apr. 3, 2019

(51) Int. Cl.
    *E03F 1/00* (2006.01)
    *C02F 9/00* (2006.01)
    *E03F 5/10* (2006.01)
    *E03F 5/04* (2006.01)
    *C02F 1/00* (2006.01)
    *C02F 103/00* (2006.01)
    *C02F 1/40* (2006.01)
    *C02F 101/32* (2006.01)
    *C02F 1/38* (2006.01)

(52) U.S. Cl.
    CPC .............. *C02F 9/00* (2013.01); *E03F 1/002* (2013.01); *E03F 5/0403* (2013.01); *E03F 5/0404* (2013.01); *E03F 5/101* (2013.01); *C02F 1/004* (2013.01); *C02F 1/385* (2013.01); *C02F 1/40* (2013.01); *C02F 2101/32* (2013.01); *C02F 2103/001* (2013.01)

(58) Field of Classification Search
    CPC ....... E03F 1/002; E03F 5/0403; E03F 5/0404; E03F 5/046; E03F 5/10; E03F 5/101; E03F 5/14; C02F 2103/001
    USPC .................. 210/170.03, 747.2, 747.3; 405/36
See application file for complete search history.

(56) References Cited

U.S. PATENT DOCUMENTS

| | | | | |
|---|---|---|---|---|
| 6,524,473 | B2 * | 2/2003 | Williamson | E03F 5/14 210/170.03 |
| 6,533,941 | B2 * | 3/2003 | Butler | E03F 5/0404 210/747.3 |
| 7,025,887 | B1 * | 4/2006 | Kirts | E03F 1/002 210/170.03 |
| 7,441,661 | B2 | 10/2008 | Phillips | |
| 7,527,731 | B2 | 5/2009 | Su et al. | |
| 7,540,954 | B2 * | 6/2009 | An | E03F 11/00 210/170.03 |
| 8,333,885 | B1 | 12/2012 | Iorio | |
| 8,535,533 | B2 | 9/2013 | Allard | |
| 9,352,978 | B2 | 5/2016 | Harvey | |
| 2005/0072738 | A1 * | 4/2005 | Weir | E03F 5/0404 210/163 |
| 2007/0289908 | A1 * | 12/2007 | Williamson | E03F 5/14 210/170.03 |

(Continued)

*Primary Examiner* — Christopher Upton
(74) *Attorney, Agent, or Firm* — Parsons & Goltry, PLLC; Michael W. Goltry; Robert A. Parsons

(57) ABSTRACT

A stormwater collection, treatment, and aquifer replenishment installation includes a stormwater drain for receiving surface stormwater, a dry well downwardly extending underground to an outlet proximate to a water table over an aquifer, a tank structure at least partially disposed underground and coupled with the stormwater drain and the dry well in stormwater communication, a stormwater treatment system enclosed within the tank structure between the stormwater drain and the dry well for converting surface stormwater into treated stormwater, the tank structure for conducting surface stormwater to the stormwater treatment system between the stormwater drain and the dry well, and the dry well for receiving and gravity feeding treated stormwater from stormwater treatment system to the outlet.

41 Claims, 10 Drawing Sheets

(56) References Cited

U.S. PATENT DOCUMENTS

| | | | |
|---|---|---|---|
| 2008/0047886 A1* | 2/2008 | Lambert | E03F 1/002 210/170.03 |
| 2008/0121579 A1* | 5/2008 | Dierkes | E03F 5/0404 210/170.03 |
| 2013/0299403 A1 | 11/2013 | Drake | |
| 2015/0129473 A1* | 5/2015 | Kent | E03F 5/14 210/170.03 |
| 2015/0183659 A1* | 7/2015 | Kent | E03F 5/14 210/170.03 |
| 2016/0176732 A1 | 6/2016 | Holtz et al. | |

* cited by examiner

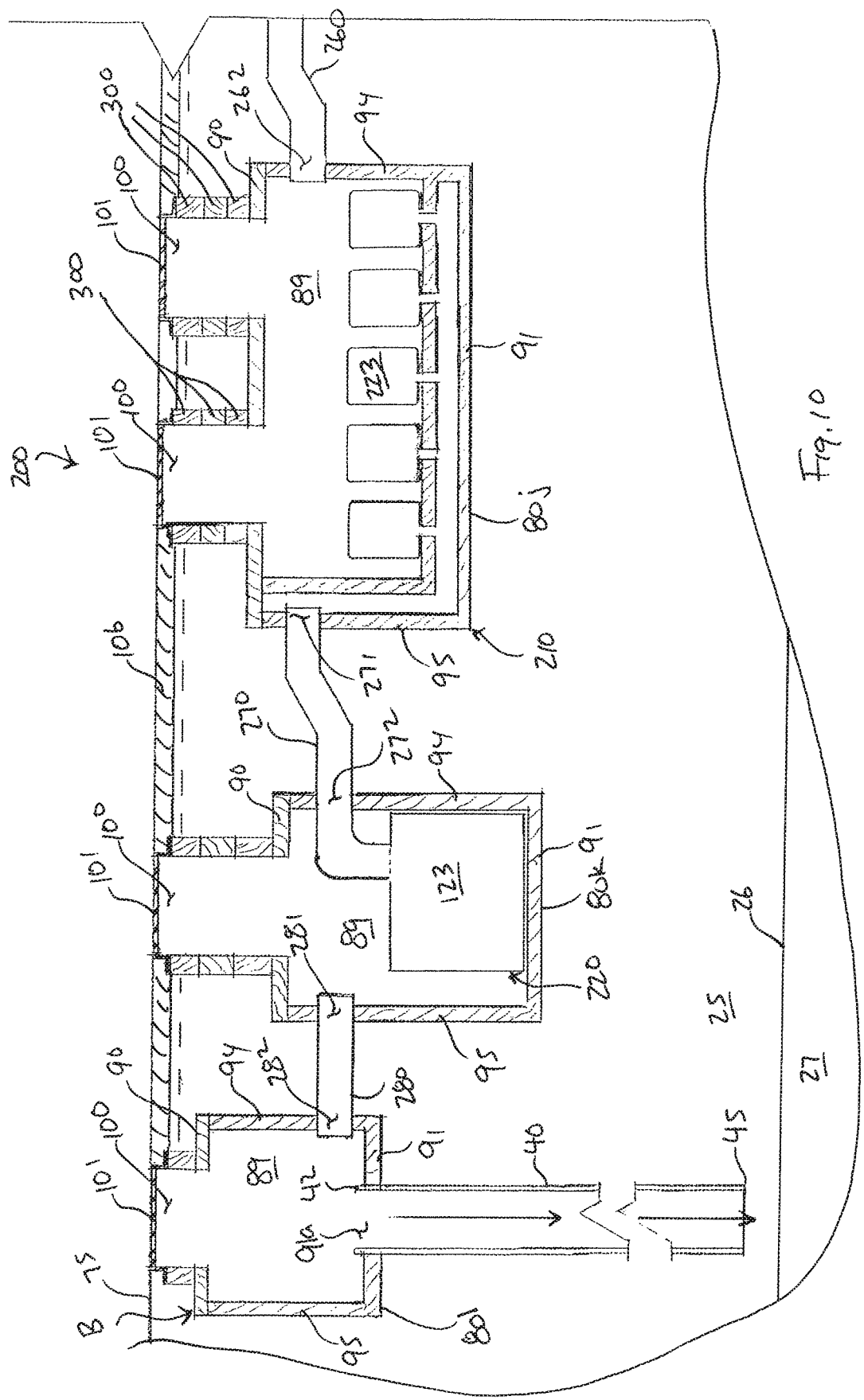

STORMWATER COLLECTION, TREATMENT, AND AQUIFER REPLENISHMENT INSTALLATIONS AND METHODS

FIELD OF THE INVENTION

The present invention relates to aquifer management, to stormwater drainage, and to apparatus and methods for collecting and treating stormwater and replenishing an aquifer therewith.

BACKGROUND OF THE INVENTION

An aquifer is a water-bearing stratum of permeable rock, sand, or gravel. An aquifer resides in the phreatic zone of the Earth's crust under the vadose zone of the Earth's crust. The vadose zone is an unsaturated zone between the land surface and the top of the phreatic zone. The phreatic zone, saturated zone, or "zone of saturation" is the area of an aquifer below the vadose zone that is saturated with water. The water table of the aquifer is between the vadose zone and the phreatic zone. Accordingly, the vadose zone extends from the land surface to the water table, and the aquifer extends from the water table. A capillary fringe of the vadose zone resides immediately above the water table. The capillary fringe is the subsurface layer in which groundwater seeps up from the water table by capillary action to fill pores. The pores at the base of the capillary fringe are filled with water due to tension saturation. This saturated portion of the capillary fringe is less than total capillary rise because of the presence of a mix in pore size. Capillary action supports the vadose zone above the capillary fringe within which the water content decreases with distance above the water table. Aquifers that provide sustainable fresh groundwater to urban areas and agricultural areas are typically close to the ground surface, within a couple of hundred meters, and have some recharge by fresh water customarily from rivers, snow/ice melt, and/or precipitation that percolates into the aquifer through the vadose zone.

Aquifers are critically important for human habitation and agriculture. While some aquifers are replenished by rainfall that percolates through the vadose zone, overharvesting can lead to exceeding the practical sustained yield. In fact, increased groundwater consumption along some coastlines throughout the world caused by population demands has lowered the water tables and caused groundwater contamination by saltwater from the sea.

Stormwater is water generated by precipitation events and snow/ice melt. Stormwater can infiltrate the soil, reside on the surface and evaporate, or runoff to nearby washes, streams, rivers, reservoirs, ponds, and other surface waters. In forests and other natural environments, the soil absorbs much of the stormwater, and plant growth naturally hold the stormwater close to where it falls.

In developed environments, impervious surfaces such as parking lots, roads, buildings, and compacted soil do not allow stormwater to infiltrate the vadose zone and percolate to the underlying aquifer. This creates more stormwater runoff compared to undeveloped environments, which can erode watercourses (rivers, streams, creeks, and washes), overwhelm conventional stormwater collection systems, and cause major urban flooding.

Daily human activities in urban areas result in the deposition of pollutants, such as such as oil/grease, phosphorous, nitrogen, bacteria, heavy metals, pesticides, sediments, and other inorganic and organic constituents, on the impervious surfaces. Stormwater runoff in urban areas picks up these surface pollutants from the impervious surfaces and transports them into downstream receiving waters. The polluted stormwater entering downstream receiving waters is termed "polluted runoff." Although there can be some attenuation of the pollutants of the polluted runoff before entering the receiving waters, the quantities of the pollutants in the polluted runoff can be sufficient to impair the receiving waters.

Accordingly, unmanaged stormwater in developed environments can cause major urban flooding and distribute pollutants to downstream receiving waters. As a result, stormwater management techniques are commonly implemented in developed environments in the effort to treat, store, and divert stormwater for controlling flooding, erosion, and the distribution of pollutants.

Stormwater management involves both structural or engineered control devices and systems designed to treat or store stormwater, as well as operational or procedural practices, such as street sweeping. Common structural or engineered control devices or systems include storm drains, retention basins, detention basins, and infiltration basins.

The storm drain is an infrastructure designed to drain runoff from impervious surfaces such as paved streets, car parks, parking lots, footpaths, sidewalks, and roofs. Many storm drain systems are gravity sewers that drain untreated stormwater into rivers or streams. Storm drains often cannot manage the quantity of stormwater generated from heavy rains or storms. Inundated storm drains can cause basement and street flooding. In fact, many urban areas require expensive detention tanks inside a property that temporarily hold runoff in heavy rains and restrict outlet flow to the public sewer for reducing the risk of overwhelming the public sewer. Some storm drains undesirably mix stormwater with sewage, either intentionally in the case of combined sewers, or unintentionally.

The retention basin is used to manage stormwater runoff to prevent flooding and downstream erosion, and to improve water quality in adjacent watercourses. The retention basin, otherwise referred to as a wet pond, a wet detention basin, or a stormwater management pond, is an expensive, space-consuming, artificial lake with vegetation planted around the perimeter, and includes a permanent pool of water in its design. In urban areas, impervious surfaces reduce the time spent by rainfall before entering into the stormwater drainage system, which, if left unchecked, can cause widespread downstream flooding. An important function of the retention basin is to contain this surge and release it slowly to mitigate the size and intensity of storm-induced flooding on downstream receiving waters. Stormwater ponds also collect suspended sediments, which are often found in high concentrations in stormwater water due to upstream construction and sand applications to roadways. However, mosquitoes and other pest can proliferate in the loitering or standing stormwater during the slow drainage process. Further, the suspended sediments collected in the retention basin must be periodically removed and transported to a designated disposal site at substantial cost.

Detention basins and infiltration basins are also used to manage stormwater runoff and prevent flooding and downstream erosion. The detention basin or "dry pond" is a large, shallow depression formed in the land surface that temporarily stores water after a storm, and slowly empties at a controlled rate to a downstream water body. Detention basins are notoriously expensive to build, occupy large amounts of open space, and hold standing water for periods of time sufficient to enable mosquitoes and other pests to proliferate.

The infiltration basin, also known as a recharge basin, a sump, or a percolation pond, is a shallow artificial pond designed to infiltrate untreated stormwater through permeable soils into the underlying groundwater aquifer. Infiltration release water by infiltration, evaporation, or emergency overflow during flood conditions. Infiltration basins are expensive, occupy large amounts of open space, must be frequently maintained, fail if not frequently maintained, and must be carefully designed at substantial cost. Further, the use of infiltration basins is not recommended for use in areas with high clay soil content, unless the soil at the particular site is engineered at substantial cost to sufficiently improve the infiltration characteristics to enable the infiltration basin to work for its intended purpose.

Although the foregoing stormwater management techniques are adequate, they are not entirely satisfactory. For instance, storm drains often cannot manage the quantity of stormwater generated from heavy rains or storms. Inundated storm drains can cause basement and street flooding. In fact, many urban areas require expensive detention tanks inside a property that temporarily hold runoff in heavy rains and restrict outlet flow to the public sewer for reducing the risk of overwhelming the public sewer. Some storm drains undesirably mix stormwater with sewage, either intentionally in the case of combined sewers, or unintentionally. Retention, detention, and infiltration basins are notoriously expensive, occupy large amounts of space, and collect suspended sediments that must be periodically removed and transported to designated disposal sites at substantial cost. Further, mosquitoes and other pest can proliferate in the loitering stormwater in these basins during the slow drainage process. Additionally, infiltration basins must be frequently maintained, fail if not frequently maintained, and must be carefully designed at substantial cost. Moreover, the use of infiltration basins is not recommended for use in areas with high clay soil content, unless the soil at the given site is engineered at substantial cost to sufficiently improve the infiltration characteristics to enable the infiltration basin to work for its intended purpose.

Given these and other deficiencies in the art, persons having ordinary skill in the art will readily appreciate that the need for continued improvement in the art of stormwater management is needed.

SUMMARY OF THE INVENTION

According to the principle of the invention, a stormwater collection, treatment, and aquifer replenishment installation includes a stormwater drain for receiving surface stormwater, a dry well downwardly extending underground to an outlet proximate to a water table over an aquifer, a tank structure at least partially disposed underground and coupled with the stormwater drain and the dry well in stormwater communication, and a stormwater treatment system enclosed within the tank structure between the stormwater drain and the dry well for converting surface stormwater into treated stormwater. The tank structure is for conducting surface stormwater to the stormwater treatment system between the stormwater drain and the dry well, and the dry well is for receiving and gravity feeding treated stormwater from stormwater treatment system to the outlet. The stormwater treatment system includes stormwater treatment components coupled in series in stormwater communication between the stormwater drain and the dry well. The stormwater treatment components are different from one another and include a hydrodynamic separator and a fine particle filter. In one embodiment, the stormwater treatment components additionally include a petrochemical filter and a chemical filter, the hydrodynamic separator is coupled in stormwater communication with the stormwater drain, one of the petrochemical filter and the chemical filter is coupled in stormwater communication with the hydrodynamic separator, the other one of the petrochemical filter and the chemical filter is coupled in stormwater communication with the one of the petrochemical filter and the chemical filter, and the fine particle filter is coupled in stormwater communication with the other one of the petrochemical filter and the chemical filter, and the dry well. In another embodiment, the stormwater treatment components additionally include a sand and oil interceptor, a hydrocarbon filter, and a media filtration system, the sand and oil interceptor is coupled in stormwater communication with the stormwater drain, the hydrodynamic separator is coupled in stormwater communication with the sand and oil interceptor, the hydrocarbon filter is coupled in stormwater communication with the hydrodynamic separator, the media filtration system is coupled in stormwater communication with the hydrocarbon filter, and the fine particle filter is coupled in stormwater communication with the media filtration system, and the dry well. The tank structure defines an aboveground walk for pedestrians. In addition, there is at least one manhole to within the tank structure, and a manhole cover movable between a closed position to close the at least one manhole and an open position to open the at least one manhole.

According to the principle of the invention, a stormwater collection, treatment, and aquifer replenishment installation includes a stormwater drain for receiving surface stormwater, a dry well downwardly extending underground to proximate to a water table over an aquifer, tanks at least partially disposed underground, the tanks are separate from one another and are coupled in series in stormwater communication from the stormwater drain to the dry well, and a stormwater treatment system enclosed within the tanks between the stormwater drain and the dry well for converting surface stormwater into treated stormwater. The tanks are for conducting surface stormwater to the stormwater treatment system between the stormwater drain and the dry well, and the dry well is for receiving and gravity feeding treated stormwater from the stormwater treatment system to the outlet. The stormwater treatment system includes stormwater treatment components coupled in series in stormwater communication between the stormwater drain and the dry well. The stormwater treatment components are different from one another and are each enclosed in one of the tanks. The stormwater treatment components include a hydrodynamic separator and a fine particle filter. In one embodiment, the stormwater treatment components additionally include a petrochemical filter and a chemical filter, the hydrodynamic separator is coupled in stormwater communication with the stormwater drain, one of the petrochemical filter and the chemical filter is coupled in stormwater communication with the hydrodynamic separator, the other one of the petrochemical filter and the chemical filter is coupled in stormwater communication with the one of the petrochemical filter and the chemical filter, and the fine particle filter is coupled in stormwater communication with the other one of the petrochemical filter and the chemical filter, and the dry well. In another embodiment, the stormwater treatment components additionally include a sand and oil interceptor, a hydrocarbon filter, and a media filtration system, the sand and oil interceptor is coupled in stormwater communication with the stormwater drain, the hydrodynamic separator is coupled in stormwater communication with the sand and oil interceptor, the hydrocarbon filter is coupled in stormwater communication with the hydrodynamic separator, the media filtration system is coupled in stormwater communication with the hydrocarbon filter, and the fine particle filter is coupled in stormwater communication with the media filtration system, and the dry well. Each of the tanks defines an aboveground walk section. The walk sections cooperate to define an aboveground walk for pedestrians. Each of the tanks additionally includes at least one manhole to within the tank, and a manhole cover movable between a closed position to close the at least one manhole and an open position to open the at least one manhole. Each of the tanks is formed of a material having rigid and load-bearing material characteristics, such as at least one of reinforced concrete, cast iron, steel, and polymer plastic.

According to the principle of the invention, a stormwater collection, treatment, and aquifer replenishment installation includes a stormwater drain through a curb built along a side of an impervious surface to form a part of a gutter, the stormwater drain for receiving surface stormwater, a dry well downwardly extending underground to an outlet proximate to a water table over an aquifer, a tank structure at least partially disposed underground and coupled with the stormwater drain and the dry well in stormwater communication, and a stormwater treatment system enclosed within the tank structure between the stormwater drain and the dry well for converting surface stormwater into treated stormwater. The tank structure is for conducting surface stormwater to the stormwater treatment system between the stormwater drain and the dry well, and the dry well is for receiving and gravity feeding treated stormwater from stormwater treatment system to the outlet. The stormwater treatment system includes stormwater treatment components coupled in series in stormwater communication between the stormwater drain and the dry well. The stormwater treatment components are different from one another and include a hydrodynamic separator and a fine particle filter. In one embodiment, the stormwater treatment components additionally include a petrochemical filter and a chemical filter, the hydrodynamic separator is coupled in stormwater communication with the stormwater drain, one of the petrochemical filter and the chemical filter is coupled in stormwater communication with the hydrodynamic separator, the other one of the petrochemical filter and the chemical filter is coupled in stormwater communication with the one of the petrochemical filter and the chemical filter, and the fine particle filter is coupled in stormwater communication with the other one of the petrochemical filter and the chemical filter, and the dry well. In another embodiment, the stormwater treatment components additionally include a sand and oil interceptor, a hydrocarbon filter, and a media filtration system, the sand and oil interceptor is coupled in stormwater communication with the stormwater drain, the hydrodynamic separator is coupled in stormwater communication with the sand and oil interceptor, the hydrocarbon filter is coupled in stormwater communication with the hydrodynamic separator, the media filtration system is coupled in stormwater communication with the hydrocarbon filter, and the fine particle filter is coupled in stormwater communication with the media filtration system, and the dry well. An aboveground sidewalk for pedestrians is built along the side of the impervious surface, and the tank structure defines a part of the sidewalk. There is at least one manhole to within the tank structure through the part of the sidewalk, and a manhole cover movable between a closed position to close the at least one manhole and an open position to open the at least one manhole.

According to the principle of the invention, a stormwater collection, treatment, and aquifer replenishment installation includes a stormwater drain through a curb built along a side of an impervious surface to form a part of a gutter, the stormwater drain for receiving surface stormwater, a dry well downwardly extending underground to proximate to a water table over an aquifer, tanks at least partially disposed underground, the tanks are separate from one another and are coupled in series in stormwater communication from the stormwater drain to the dry well, and a stormwater treatment system enclosed within the tanks between the stormwater drain and the dry well for converting surface stormwater into treated stormwater. The tanks are for conducting surface stormwater to the stormwater treatment system between the stormwater drain and the dry well, and the dry well is for receiving and gravity feeding treated stormwater from the stormwater treatment system to the outlet. The stormwater treatment system includes stormwater treatment components coupled in series in stormwater communication between the stormwater drain and the dry well. The stormwater treatment components are different from one another and are each enclosed in one of the tanks. The stormwater treatment components include a hydrodynamic separator and a fine particle filter. In one embodiment, the stormwater treatment components additionally include a petrochemical filter and a chemical filter, the hydrodynamic separator is coupled in stormwater communication with the stormwater drain, one of the petrochemical filter and the chemical filter is coupled in stormwater communication with the hydrodynamic separator, the other one of the petrochemical filter and the chemical filter is coupled in stormwater communication with the one of the petrochemical filter and the chemical filter, and the fine particle filter is coupled in stormwater communication with the other one of the petrochemical filter and the chemical filter, and the dry well. In another embodiment, the stormwater treatment components additionally include a sand and oil interceptor, a hydrocarbon filter, and a media filtration system, the sand and oil interceptor is coupled in stormwater communication with the stormwater drain, the hydrodynamic separator is coupled in stormwater communication with the sand and oil interceptor, the hydrocarbon filter is coupled in stormwater communication with the hydrodynamic separator, the media filtration system is coupled in stormwater communication with the hydrocarbon filter, and the fine particle filter is coupled in stormwater communication with the media filtration system, and the dry well. An aboveground sidewalk for pedestrians is built along the side of the impervious surface, and each of the tanks defines a part of the sidewalk. Each of the tanks includes at least one manhole to within the tank through the part of the sidewalk, and a manhole cover movable between a closed position to close the at least one manhole and an open position to open the at least one manhole. Each of the tanks is formed of a material having rigid and load-bearing material characteristics, such as at least one of reinforced concrete, cast iron, steel, and polymer plastic.

BRIEF DESCRIPTION OF THE DRAWINGS

Referring to the drawings:

FIGS. 8-10 illustrate partial section views of sections of an alternate embodiment of a stormwater collection, treatment, and aquifer replenishment installation constructed and arranged in accordance with the principle of the invention.

DETAILED DESCRIPTION

Disclosed herein are stormwater collection, treatment, and aquifer replenishment installations and methods useful for collecting surface stormwater, processing the surface stormwater into treated stormwater, and positively supplying/replenishing/recharging an aquifer with the treated stormwater, according to the principle of the invention. As defined herein, the term "aboveground" means located or occurring on, at, or above the surface of the ground being not "underground" meaning beneath the surface of the ground or "subterraneanly" disposed.

I

Figure 1:
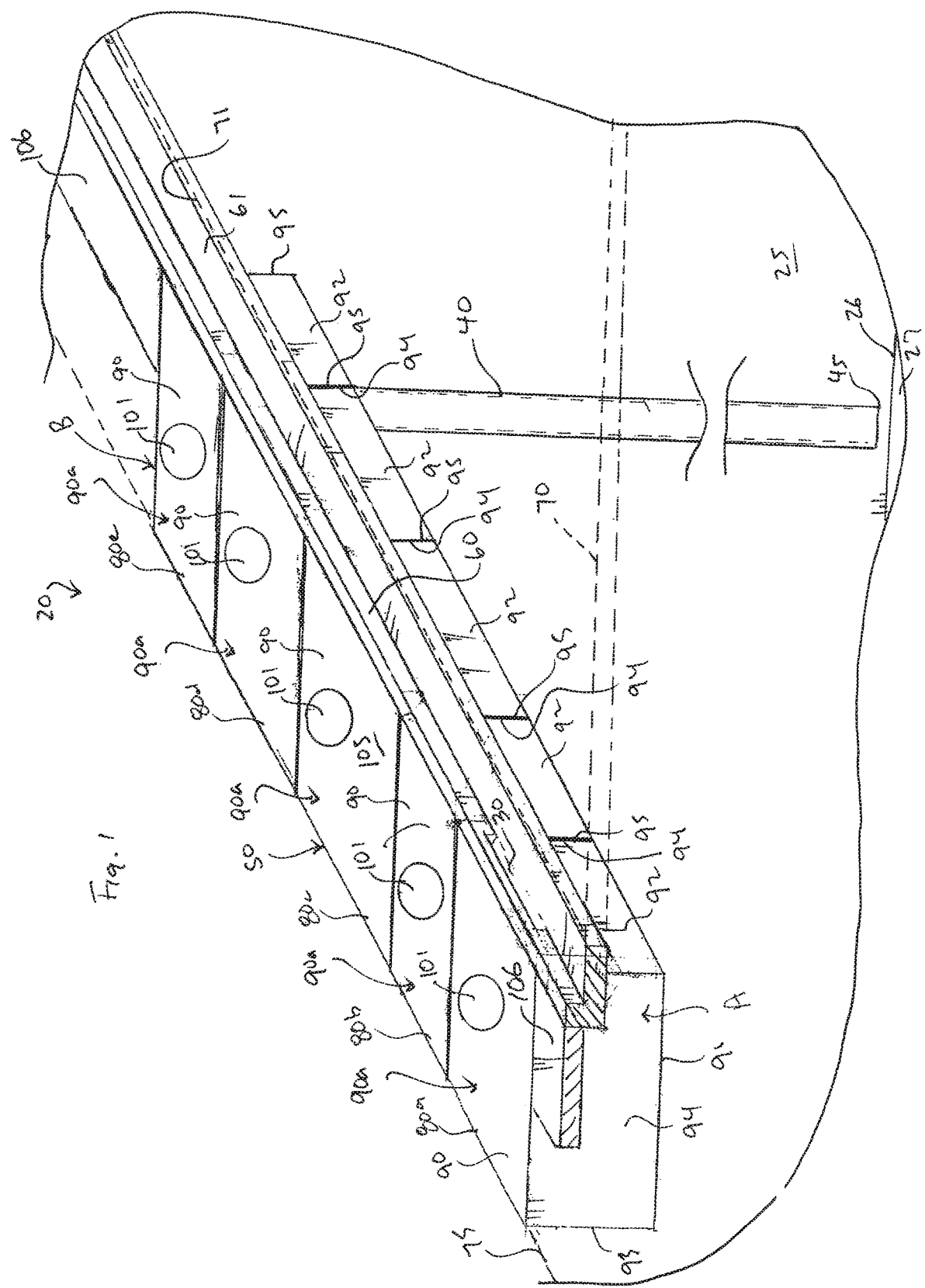
FIG. 1 is a perspective view of a stormwater collection, treatment, and aquifer replenishment installation constructed and arranged in accordance with the principle of the invention.
Figure 2:
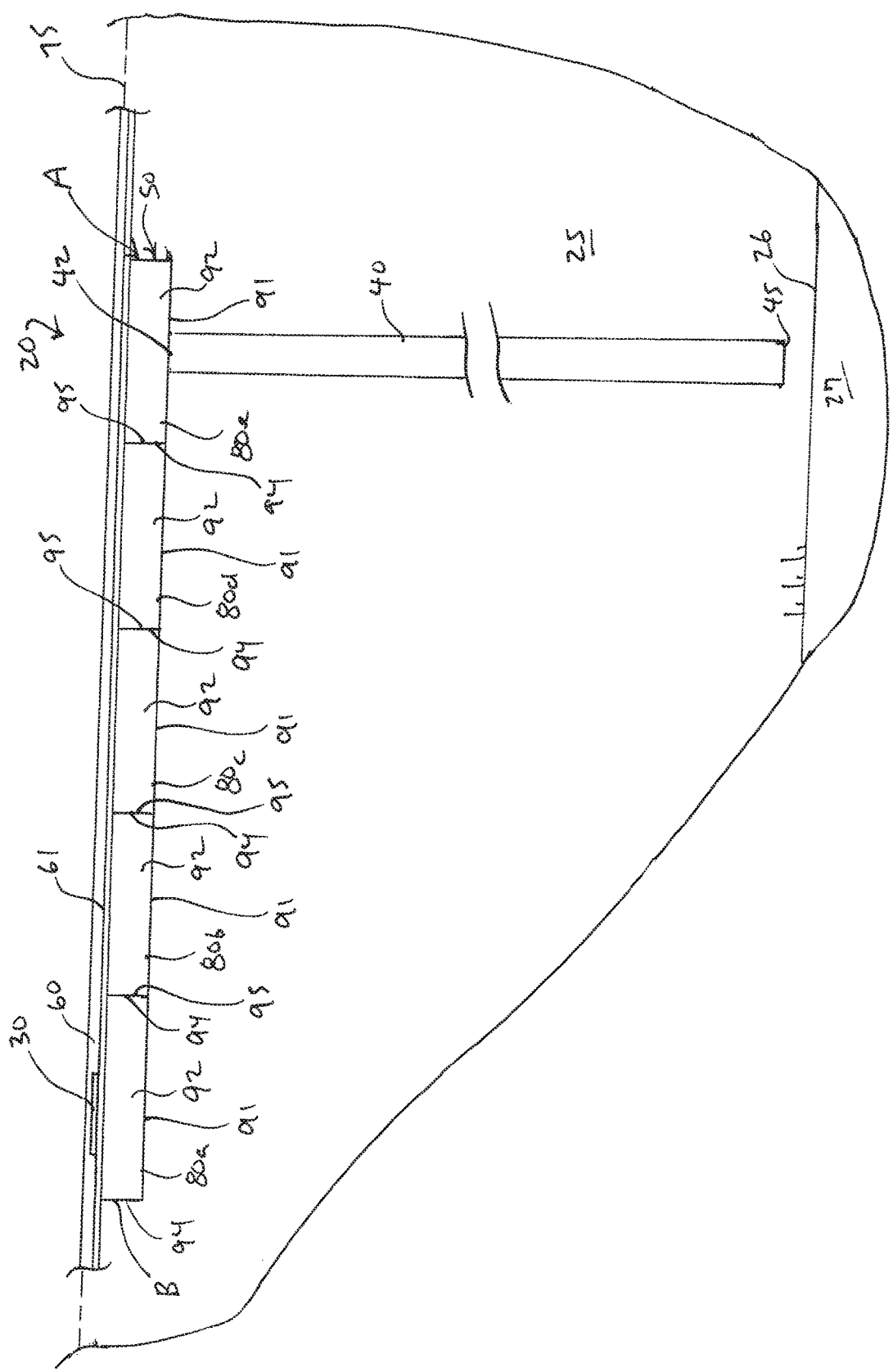
FIG. 2 is a front elevation view of the embodiment of FIG. 1.

Referring to FIGS. 1 and 2, an exemplary embodiment of the invention is a stormwater collection, treatment, and aquifer replenishment installation 20. Installation 20 is a useful and efficient alternative to conventional stormwater management techniques discussed above, especially commonly-used retention basins, detention basins, and infiltration basins and the various problems associated therewith. Installation 20 includes stormwater drain 30 for receiving surface stormwater, dry well 40 downwardly extending underground to outlet 45 proximate to aquifer 27, namely, proximate to water table 26 over an underlying aquifer 27, tank structure 50 coupled with stormwater drain 30 and dry well 40 in stormwater communication, and a stormwater treatment system enclosed within tank structure 50 between stormwater drain 30 and dry well 40 for converting surface stormwater into treated stormwater. Tank structure 50 is for receiving and conducting surface stormwater from stormwater drain 30 to the stormwater treatment system enclosed within tank structure 50. Dry well 40 is for receiving and gravity feeding treated stormwater generated by the stormwater treatment system of installation 20 from tank structure 50 to outlet 45 in vadose zone 25. The stormwater treatment system is designed to separate, treat, and/or remediate mixed debris, sands, sediment, entrained and dissolved chemical, petrochemical, biological and other debris/contaminants/pollutants from surface stormwater, i.e. untreated stormwater, entering the tank structure through stormwater drain 30 before it is gravity fed as treated stormwater to aquifer 27 via dry well 40 for replenishment purposes. Dry well 40 extends downwardly underground to outlet 45 in vadose zone 25 above and proximate to water table 26 over underlying aquifer 27. Instead of diverting the treated stormwater to adjacent water courses, such as rivers, streams, creeks, canals, and lakes, the treated stormwater generated by the stormwater treatment system advantageously enters vadose zone 25 from outlet 45 of dry well 40, which automatically, naturally, and advantageously percolates downwardly through vadose zone 25 from outlet 45 of dry well 40 to water table 26 and into underlying aquifer 27 for advantageously supplying/replenishing/recharging aquifer 27 below water table 26 with the treated stormwater, according to the principle of the invention. The stormwater treatment system of installation 20 between stormwater drain 30 and dry well 40 improves the quality of the untreated, surface stormwater entering installation 20 before it is applied as improved-quality or treated stormwater to dry well 40, the improved-quality or treated stormwater being the subtraction of debris and contaminant components as described herein from the surface stormwater entering installation 20.

Aquifer 27 is a standard water-bearing stratum of permeable rock, sand, or gravel, which resides in the phreatic zone of the Earth's crust under vadose zone 25 of the Earth's crust. Vadose zone 25 is an unsaturated zone between the land surface and the top of aquifer 27 at the phreatic zone, which is a saturated zone or "zone of saturation" below vadose zone 25 that is saturated with water, and water table 26 is between vadose zone 25 and the phreatic zone where aquifer 25 resides. Accordingly, vadose zone 25 extends from the land surface to water table 26 over aquifer 25. Aquifer 25 provides sustainable fresh groundwater to the area where installation 20 is installed, and in this example, is within a couple of hundred meters under the land surface or ground level where installation 20 is installed.

Stormwater drain 30 in FIG. 1 is specifically positioned at a drainage point for receiving surface stormwater. In FIG. 1, stormwater drain 30 is disposed proximate to ground level for receiving surface stormwater from an impervious surface of a type commonly found in developed areas, such as a street, a parking lot, or other impervious surface disposed proximate to ground level defined here by land or ground surface/level denoted at 75.

In installation 20 in FIG. 1, stormwater drain 30 is a standard stormwater drain 30 formed through a standard curb 60 built proximate to ground level along a side 71 of impervious surface 70 to form a part of gutter 61. Impervious surface 70 is disposed proximate to ground level. Ground-level curbs, like curb 60, are commonly built next to streets and parking lots, two forms of impervious surfaces commonly found in developed areas. Stormwater drain 30 can be configured with a standard grate of metal for keeping tree limbs, cans, bottles, and other large debris from entering installation 20. Accordingly, in exemplary embodiments impervious surface 70 is a standard street in one embodiment, and is a standard parking lot in another embodiment. Accordingly, impervious surface 70 is a standard impervious surface commonly found in urban and developed areas, such as a street or a parking lot in exemplary embodiments, along the sides of which curbs are customarily built. Curb 60, an edging of concrete, is a standard curb built alongside streets and parking lots. Gutter 61, a low area, trough, or groove of concrete to carry off surface water from impervious surface 70, is a standard gutter commonly built with curbs alongside impervious surfaces in developed area, including streets and parking lots. Impervious surface 70 denoted in phantom line in FIG. 1 and which is further illustrated in FIG. 5, which is a top plan view of installation 20 first illustrated in FIG. 1, is a standard thoroughfare or lot, such as of asphalt or concrete, over which vehicles are driven and/or parked.

In FIGS. 1-5, impervious surface 70 is built along the curb side of gutter 61, and tank structure 50 that houses the stormwater treatment system of installation 20 is at least partially disposed underground, i.e. below land or ground surface denoted at 75, adjacent to and along curb 60 on the opposite side of curb 60. Tanks 80a-80e form tank structure 50, and are set into an appropriate excavation, dug by excavation equipment, along the opposite side of curb 60 from which impervious surface 70 is located, and which is appropriately backfilled with excavated material in a customary manner. Before installing tanks 80a-80e into the excavation, dry well 40, a conventional underground structure that disposes of treated stormwater, is conventionally installed underground using known techniques from inlet 42 at the bottom of the excavation below land surface 75 to outlet 45 in vadose zone 25 above and proximate to water table 26 over an underlying aquifer 27. Dry well 40 is formed by standard dry well piping extending from inlet 42 to outlet 45. Having formed the appropriate excavation and installed dry well 40, tanks 80a-80e forming tank structure 50 are set into the excavation over dry well 40, tank structure 50 is appropriately coupled with stormwater drain 30 and dry well 40 in stormwater communication, and the excavation is appropriately backfilled.

Tanks 80a-80e are coupled together in series in stormwater communication and cooperate to form tank structure 50, according to the principle of the invention. Tanks 80a-80e are modular units each fashioned of material having rigid, load-bearing, and water-impervious material characteristics, such as reinforced concrete, cast iron, steel, polymer plastic, or other chosen fabricated material or combination of materials. Each one of tanks 80a-80e is hollow container having a selected horizontal and vertical dimension, typically being from six to eight feet deep, four to six feet wide, and eight to twelve feet long. Tanks 80a-80e can be the same size, or differently sized. When fashioned of reinforced concrete, the walls of each of tanks 80a-80e are approximately 4-6 inches thick. When fashioned of cast iron, steel, or polymer plastic, the walls of each of tanks 80a-80e are approximately ¾-1 inch thick. Accordingly, each one of tanks 80a-80e is a substantial, strong, rugged, fashioned of water-impervious material, and designed to have a long, useful lifespan. Tanks 80a-80e can each be integrally formed, or formed of a plurality of affixed parts.

Figure 5:
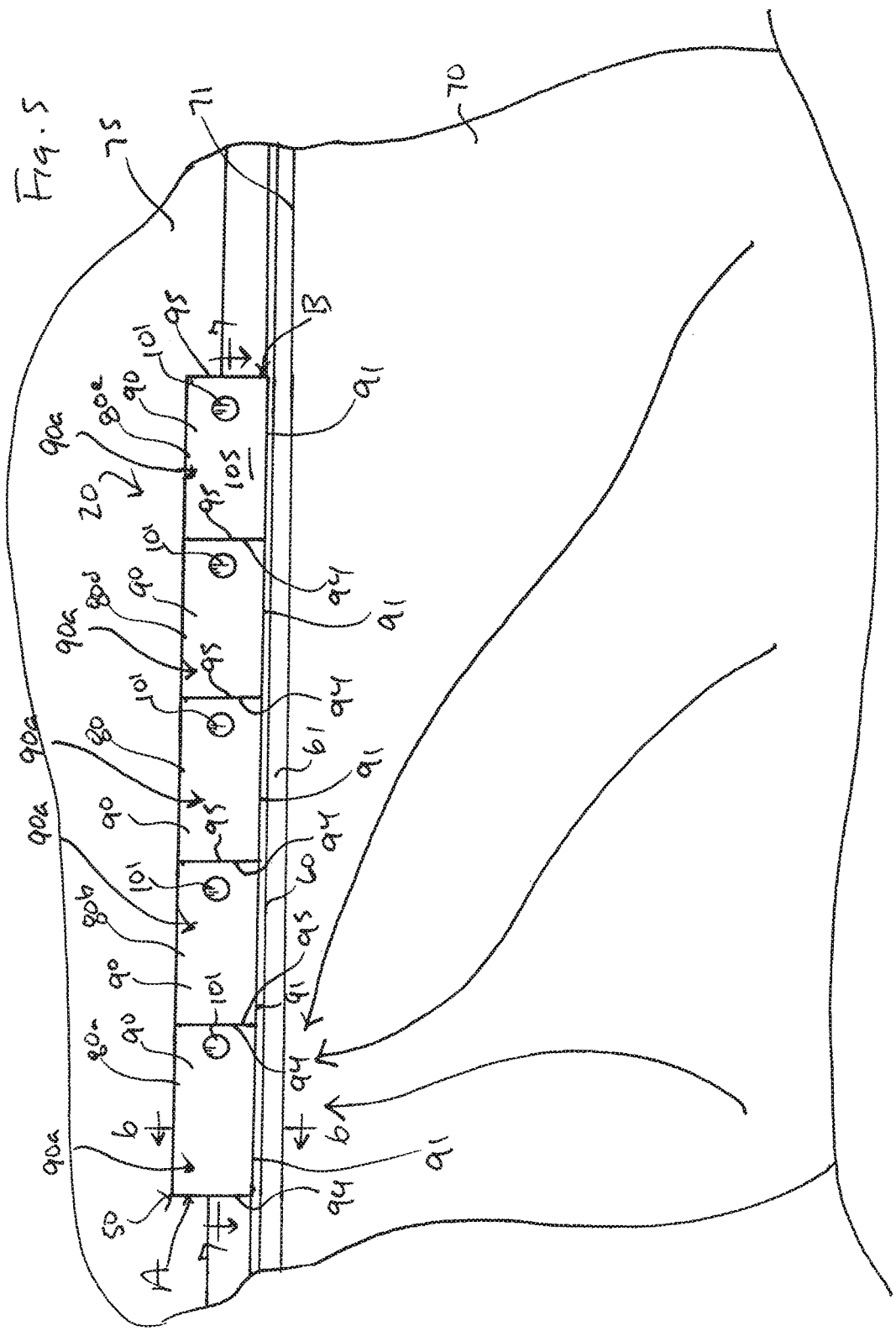
FIG. 5 is a top plan view of the embodiment of FIG. 1.
Figure 6:
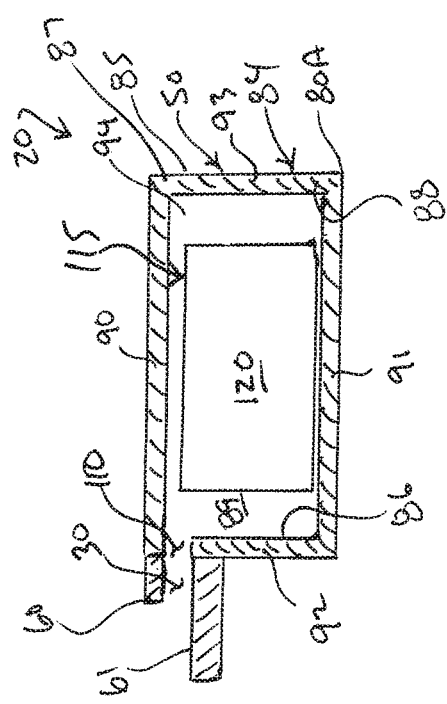
FIG. 6 is a section view taken along line 6-6 of FIG. 5.
Figure 7:
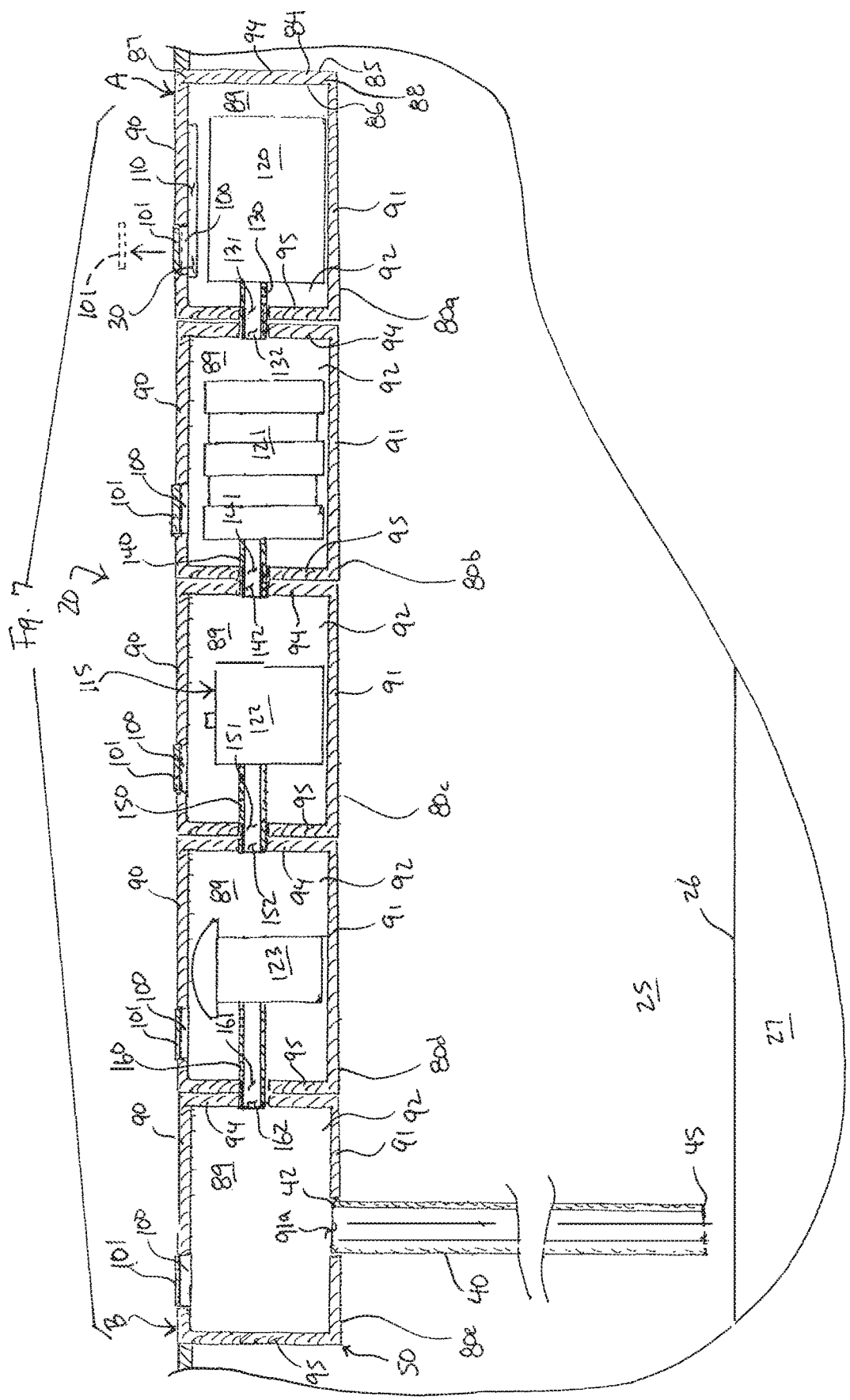
FIG. 7 is a section view taken along line 7-7 of FIG. 5.

Referring to FIGS. 6 and 7 in relevant part, tank 80a includes continuous sidewall 84 having outer surface 85, inner surface 86, upper edge 87, and lower edge 84. Horizontal top wall 90 is affixed to upper edge 87, and horizontal bottom wall 91 is affixed to lower edge 84. Top and bottom walls 90 and 91 cooperate with inner surface 86 of continuous sidewall 84 to form volume or chamber 89, which is a catch basin. In this example, continuous sidewall 84 includes axially spaced parallel front and back walls 92 and 93 that extend between axially spaced parallel side walls 94 and 95. Tank 80a is rectangular in shape in this example. In this example, front and back walls 92 and 93 are equal in length, side walls 94 and 95 are equal in length, and front and back walls 92 and 93 are longer than side walls 94 and 95, which characterizes the rectangular shape of tank 80a. In this embodiment, tank 80a is from six to eight feet deep from top wall 90 to bottom wall 91, four to six feet wide from front wall 92 to back wall 93, and eight to twelve feet long from side wall 94 to side wall 95, which provides chamber 89 of a size that is sufficient to receive equipment and one or more workman therein. In FIG. 7, top wall 90 is formed with manhole 100 to within chamber 89 of tank 80a. Manhole 100 is an opening large enough for a person and equipment to pass through that is used as an access point to chamber 89 for equipment installation, maintenance, and other work. Manhole 100 is conventional, and typically reinforced with a frame of cast iron. Manhole cover 101, is a removable plate forming the lid over manhole 100, is also provided, which is movable between a closed position in FIG. 7 to close manhole 100 and an open position denoted by the dotted line position of manhole cover 101 in FIG. 7 to open manhole 100 to enable a workman and equipment to pass through manhole 100 to access chamber 89 for equipment installation, maintenance, and other work. The remaining tanks 80b-80e are the same as tank 80a to the extent described. Accordingly, the previous discussion of tank 80a applies equally to each of tanks 80b-80e and common reference characters are used for the various tanks of installation 20 as appropriate throughout the balance of this specification. Tanks 80a-80e can vary in size and also in shape. Referring to FIGS. 1-3, 5, and 7 tanks 80a-80e are separate from one another, and are arranged side-by-side, side wall 95 to sidewall 94 from tank 80a, the upstream tank of tank structure 50, to tank 80e, the downstream tank of tank structure 50, in axial alignment horizontally from tank 80a coupled in stormwater communication with stormwater drain 30 to tank 80e coupled in stormwater communication with dry well 40, and extend upright from the various bottom walls 91 to the various top walls 90. Tanks 80a-80e are axially aligned in a horizontal direction from tank 80a, to tank 80b, to tank 80c, to tank 80d, and finally to tank 80e, in which tank 80a is the upstream tank, tank 80e is the downstream tank, tanks 80b-80d are the intermediate tanks, the various top walls 90 are horizontal and inline from tank 80a to tank 80e, the various bottom walls 91 are horizontal and inline from tank 80a to tank 80e, the various front walls 92 are upright and inline from tank 80a to tank 80e, the various back walls 93 are upright and inline from tank 80a to tank 80e, sidewall 95 of tank 80a and sidewall 94 of tank 80b are upright, juxtaposed, and parallel to one another, sidewall 95 of tank 80b and sidewall 94 of tank 80c are upright, juxtaposed, and parallel to one another, sidewall 95 of tank 80c and sidewall 94 of tank 80d are upright, juxtaposed, and parallel to one another, and sidewall 95 of tank 80d and sidewall 94 of tank 80e are upright, juxtaposed, and parallel to one another.

Figure 3:
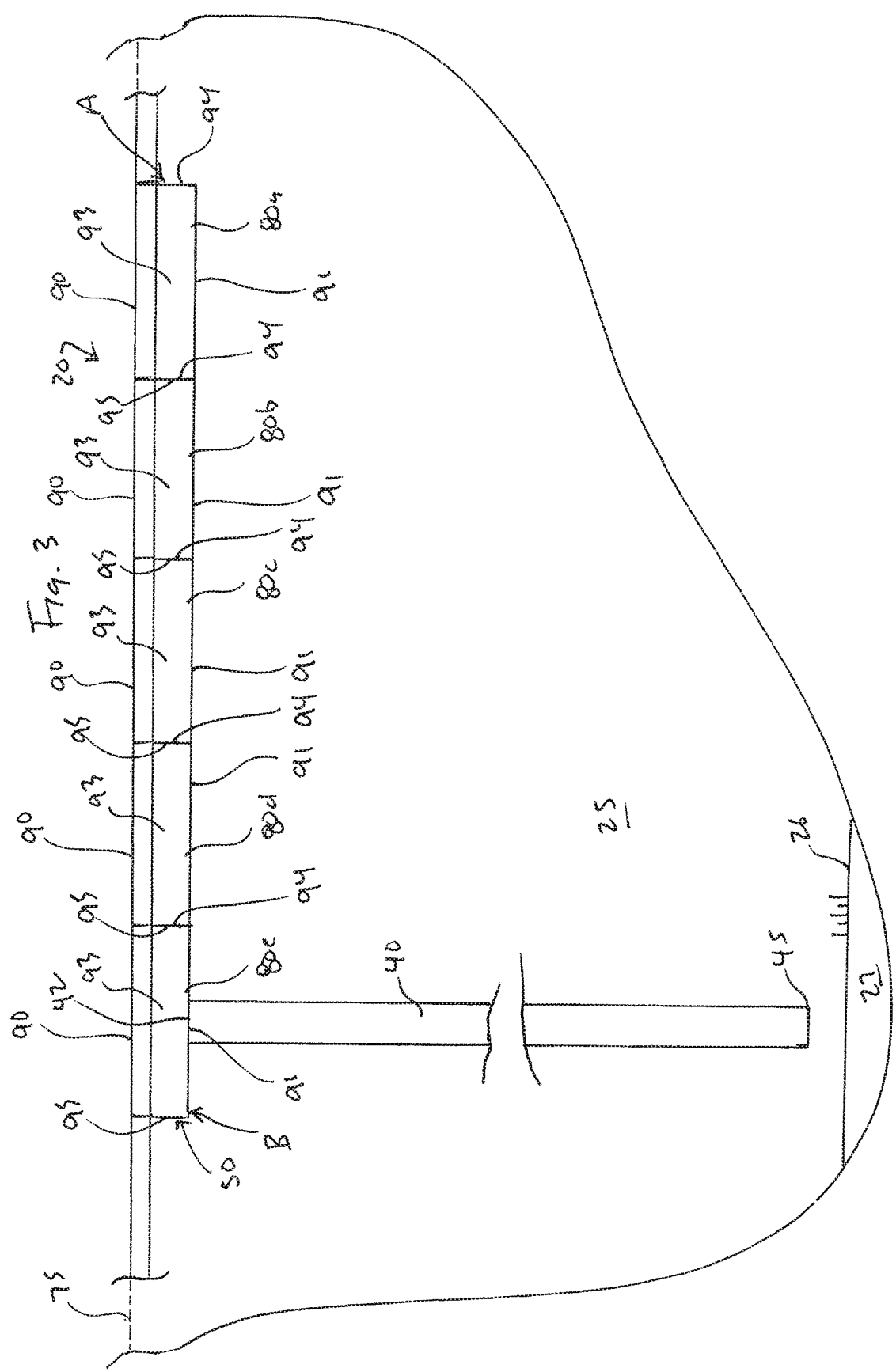
FIG. 3 is a rear elevation view of the embodiment of FIG. 1.

As explained above in connection with FIG. 1, stormwater drain 30 is formed through aboveground curb 60 built proximate to ground level, i.e. land surface 75, along the side 71 of aboveground impervious surface 70 to form a part of gutter 61, in which impervious surface 70 in this example is one of a street or a parking lot. In FIGS. 1-3, tanks 80a-80e are at least partially disposed underground in the appropriate backfilled excavation described above, and extend downwardly into the ground from the various top walls 90 located aboveground adjacent to land surface 75 and below stormwater drain 30, curb 60, gutter 61, and impervious surface 70 to the various bottom walls 91 underground at the bottom of the excavation.

Figure 4:
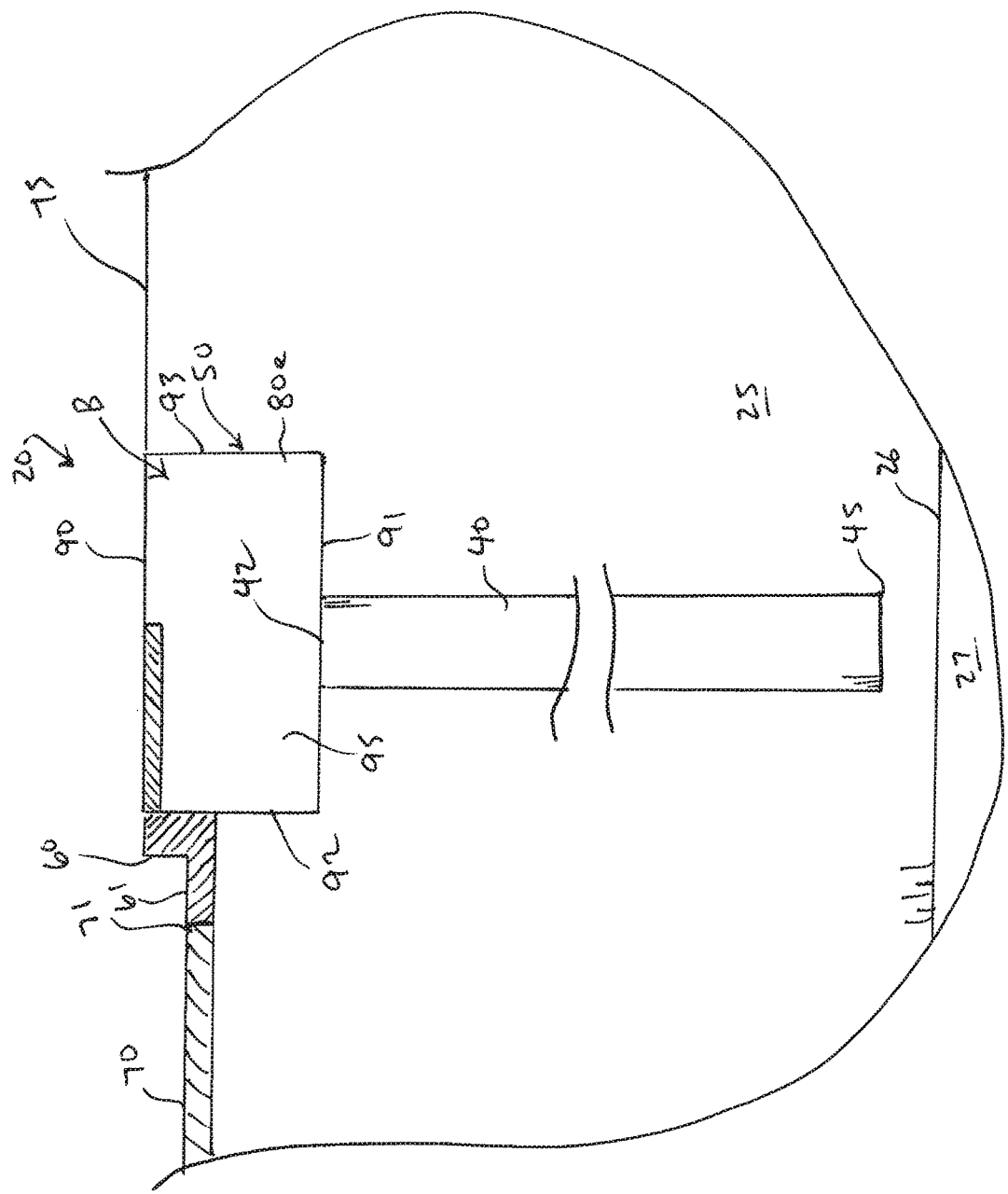
FIG. 4 is a side elevation view of the embodiment of FIG. 1.

The majority of tanks 80a-80e from the top walls 90 to the bottom walls 91 are underground below stormwater drain 30. Tanks 80 are coupled in series in stormwater communication from tank 80a coupled in stormwater communication with stormwater drain 30 to tank 80e coupled in stormwater communication with dry well 40. Tank 80a is the upstream tank of tank structure 50 at an upstream end A of tank structure 50. Tank 80e is the downstream tank of tank structure 50 at a downstream end B of tank structure 50. Tanks 80b-80e are intermediate tanks coupled in series therebetween tanks 80a and 80e. Stormwater flows in series through the various tanks 80a to 80e from stormwater drain 30 coupled in stormwater communication with tank 80a to dry well 40 coupled in stormwater communication with tank 80e. In FIGS. 1 and 4, curb 60 and gutter 61 concurrently extend along the side 71 of impervious surface 70 to tank 80a and along the various front walls 92 of tanks 80a-80e from tank 80a to tank 80e and beyond tank 80e. Curb 60 extends partially downwardly along the front walls 92 of the various tanks 80a-80e from the various top walls 90 to gutter 61, which extends outwardly to edge 71 of impervious surface 70 that extends outwardly therefrom.

Being aboveground, it is particularly advantageous that each top wall 90 defines an above ground walk section 90a in FIGS. 1 and 5 for pedestrians, wherein the various walk sections 90a defined by the various horizontal and inline top walls 90 advantageously directly abut one another in series from tank 80a to tank 80e to cooperate to form an aboveground walk denoted at 105 for pedestrians along the side 71 of impervious surface 70. In FIG. 1, a standard aboveground sidewalk 106 of concrete is built along the same side of curb 60 as tank structure 50, and extends outwardly from tank 80a at the upstream side/end of tank structure 50 and tank 80e at the downstream side/end of tank structure 50. It is particularly advantageous that walk section 90a of tank 80a at the upstream side of tank structure 50 directly abuts sidewalk 106 extending outwardly therefrom, and that walk section 90a of tank 80e at the downstream side of tank structure 50 directly abuts sidewalk 106 extending outwardly therefrom, such that the aboveground walk 105 defined by tank structure 50 cooperates to form a part of sidewalk 106 on either side of tank structure 50 over which pedestrians may walk, in accordance with the principle of the invention. Accordingly, the aboveground space occupied by tank structure 50 constitutes walk 105, which is a useful walk over which pedestrians may walk, and is, furthermore, advantageously part of sidewalk 106 over which pedestrians may walk, in accordance with the principle of the invention.

In installation 20, tank 80a is coupled in stormwater communication with stormwater drain 30 to receive surface stormwater by gravity from stormwater drain 30, tank 80b is coupled in stormwater communication with tank 80a to receive stormwater from tank 80a, tank 80c is coupled in stormwater communication with tank 80b to receive stormwater from tank 80b, tank 80d is coupled in stormwater communication with tank 80c to receive stormwater from tank 80c, tank 80e is coupled in stormwater communication with tank 80d to receive stormwater from tank 80d, and dry well 40 is coupled in stormwater communication with tank 80e to receive and gravity feed stormwater from tank 80e to outlet 45 in vadose zone 25. Again, stormwater drain 30 can be configured with a standard grate of metal for keeping tree limbs, cans, bottles, and other large debris from entering tank 80a. In FIGS. 6 and 7, tank 80a is formed with inlet 110 through front wall 92 adjacent to top wall 90 and between side walls 94 and 95 that is both coextensive and axially aligned with stormwater drain 30. Surface stormwater passes through stormwater drain 30 to inlet 110 and falls/spills downwardly through inlet 110 into chamber 89 below inlet 110 of tank 80a and stormwater drain 30. In FIG. 7, stormwater treatment system 115 of installation 20 is enclosed within the various tanks 80a-80e of tank structure 50 between stormwater drain 30 and dry well 40 for receiving surface stormwater and converting the surface stormwater into treated stormwater.

System 115 includes various stormwater treatment components coupled in series in stormwater communication between stormwater 30 drain and dry well 40 for processing surface stormwater into treated stormwater by separating, treating, and/or remediating mixed debris, sands, sediment, entrained and dissolved chemical, petrochemical, biological and other debris/contaminants/pollutants from surface stormwater, i.e. untreated stormwater, before it is gravity fed as treated stormwater to aquifer 27 via dry well 40 for supply/replenishment/recharge purposes. In this embodiment, these stormwater treatment components are different from one another and include hydrodynamic separator 120 and fine particle filter 123, and additionally petrochemical filter 121 and chemical filter 122. Hydrodynamic separator 120 is coupled in stormwater communication with stormwater inlet 30, petrochemical filter 121 is coupled in stormwater communication with hydrodynamic separator 120, chemical filter 122 is coupled in stormwater communication with petrochemical filter 121, fine particle filter 123 is coupled in stormwater communication with chemical filter 122, and dry well 40 is coupled in stormwater communication with fine particle filter 123. Surface stormwater entering chamber 89 of tank 80a through inlet 110 from stormwater drain 30 is applied in sequence to hydrodynamic separator 120 for removing large debris from the stormwater ahead of petrochemical filter 121, petrochemical filter 121 for receiving the stormwater from hydrodynamic separator 120 and removing petrochemical pollutants from the stormwater ahead of chemical filter 122, chemical filter 122 for receiving the stormwater from petrochemical filter 121 and removing organic and inorganic chemical pollutants from the stormwater ahead of fine particle filter 123, and fine particle filter 123 for receiving the stormwater from chemical filter 122 and removing fine suspended particles, such from 75 to 15 micron particles, from the storm water ahead of dry well 40 thereby forming treated stormwater. Dry well 40, in turn, is for receiving the treated stormwater from fine particle filter 123 and gravity feeding the treated stormwater downwardly to outlet 45 in vadose zone 25. Hydrodynamic separator 120, petrochemical filter 121, chemical filter 122, and fine particle filter 123 are conventional devices well known to the person having ordinary skill in the art, and are particularly useful for treating surface stormwater by removing solid debris, petrochemical pollutants, chemical pollutants, and fine particles from the surface stormwater to form treated stormwater that is applied to dry well 40. The order of the stormwater treatment components of system 115 is important to ensure that debris/pollutants/contaminants are separated, treated, and/or remediated from the stormwater from the largest to the smallest particles, and to enable an extended life for the stormwater treatment components and dry well 40. If desired, the positioning of petrochemical filter 121 and chemical filter 122 can be reversed without undue impact.

Hydrodynamic separator 120 is installed and enclosed in chamber 89 of tank 80a, petrochemical filter 121 is installed and enclosed in chamber 89 of tank 80b, chemical filter 122 is installed and enclosed in chamber 89 of tank 80c, and fine particle filter 123 is installed and enclosed in chamber 89 of tank 80d. Hydrodynamic separator 120, petrochemical filter 121, chemical filter 122, and fine particle filter 123 are each fixed in place within their respective tanks 80a-80d with bolts, ties, or the like. Hydrodynamic separator 120 in chamber 89 of tank 80a is open to inlet 110 in fluid communication stormwater drain 30, which couples hydrodynamic separator 120 to stormwater drain 30 in stormwater communication. Petrochemical filter 121 and chamber 89 of tank 80b are coupled in stormwater communication with hydrodynamic separator 120 via pipe 130, which extends from hydrodynamic separator 120 through axially-aligned openings 131 and 132 in the respective sidewalls 95 and 94 of tanks 80a and 80b between the top and bottom walls 90 and 91 of the respective tanks 80a and 80b to chamber 89 of tank 80b. Chemical filter 122 and chamber 89 of tank 80c are coupled in stormwater communication with petrochemical filter 121 via pipe 140, which extends from petrochemical filter 121 through axially-aligned openings 141 and 142 in the respective sidewalls 95 and 94 of tanks 80b and 80c between the top and bottom walls 90 and 91 of the respective tanks 80b and 80c to chamber 89 of tank 80c. Fine particle filter 123 and chamber 89 of tank 80d are coupled in stormwater communication with chemical filter 122 via pipe 150, which extends from chemical filter 122 through axially-aligned openings 151 and 152 in the respective sidewalls 95 and 94 of tanks 80c and 80d between the top and bottom walls 90 and 91 of the respective tanks 80c and 80d to chamber 89 of tank 80d. Dry well 40 and chamber 89 of tank 80e are coupled in stormwater communication with fine particle filter 123 via pipe 160, which extends from fine particle filter 123 through axially-aligned openings 161 and 162 in the respective sidewalls 95 and 94 of tanks 80d and 80e between the top and bottom walls 90 and 91 of the respective tanks 80d and 80e to chamber 89 of tank 80e. Dry well 40 includes underground inlet 42 coupled to drain 91 formed in bottom wall 91 of tank 80e. Dry well 40 is entirely underground, and extends downwardly underground to outlet 45 in vadose zone 25 above and proximate to water table 26 over underlying aquifer 27. Inlet 42 of dry well 40 at bottom wall 91 of tank 80e is open chamber 89 of tank 80e, which couples dry well 40 to fine particle filter 123 in stormwater communication. Pipes 130, 140, 150, and 160 are fashioned of polymer plastic, copper, or other suitable material commonly used for water pipes, and are fluid sealed to the various openings through which they extend with suitable gaskets or the like.

The installation and assembly of tanks 80a-80e in the excavation described above forms tank structure 50, which contains and encloses system 115 between stormwater drain 30 and inlet 42 to dry well 40. Tanks 80a-80e are preferably prefabricated with their enclosed part of system 115, transported to the chosen excavation and installed therein. The modularity of tanks 80a-80b enables them to be readily picked and moved about separately from one another, and set into the given excavation one after the other, typically with the use of fork lifts and/or other chosen forms of mechanical lifting equipment. If desired, tanks 80a-80e can be assembled onsite and then installed in the chosen excavation, or actually built onsite within the chosen excavation. Manholes 100 of the various tanks 80a-80b enable workman to enter the various chambers 89 for installing system 115 equipment and pipes 130, 140, 150, and 160 therein. As tanks 80a-80e are formed of water impervious material, tanks 80a-80e are water impervious for preventing stormwater leaking through the material of the various tanks 80a-80e to the surrounding environment.

Accordingly, after forming the appropriate excavation and installing dry well 40 extending downwardly underground from inlet 42 at the bottom of the excavation to outlet 45 in vadose zone 25, tanks 80a-80e forming tank structure 50 are set into the excavation over dry well 40 registering stormwater drain 30 with inlet 110 of tank 80a and outlet/drain 91a of tank 80e with inlet 42 of dry well 40, tanks 80a-80e are coupled in stormwater communication via the various pipes 130, 140, 150, and 160 and system 115, and the excavation is appropriately backfilled.

In the operation of installation 20, surface stormwater enters chamber 89 of tank 80a housing hydrodynamic separator 120 through stormwater drain 30 and inlet 110 and spills downwardly therefrom into chamber 89 of tank 80a. The surface stormwater flows through hydrodynamic separator 120, which removes solid debris from the stormwater, such as leaves, sticks, twigs, rocks, and the like, ahead of petrochemical filter 121. When hydrodynamic separator 120 is sufficiently full of stormwater, the stormwater spills into and through pipe 130 from hydrodynamic separator 120 to chamber 89 of tank 80b housing petrochemical filter 121 and spills by gravity downwardly from pipe 130 into chamber 89 of tank 80b.

The stormwater entering chamber 89 of tank 89b from hydrodynamic separator 120 flows through petrochemical filter 121, which removes petrochemical pollutants from the stormwater ahead of chemical filter 122. When petrochemical filter 121 is sufficiently full of stormwater, the stormwater spills into and through pipe 140 from petrochemical filter 121 to chamber 89 of tank 80c housing chemical filter 122 and spills by gravity downwardly from pipe 140 into chamber 89 of tank 80c.

The stormwater entering chamber 89 of tank 80c flows through chemical filter 122, which removes chemical pollutants from the stormwater ahead of fine particle filter 123. When chemical filter 122 is sufficiently full of stormwater, the stormwater spills into and through pipe 150 from chemical filter 122 to chamber 89 of tank 80d housing fine particle filter 123 and spills downwardly by gravity from pipe 150 into chamber of tank 80d.

The stormwater entering chamber 89 of tank 80d flows through fine particle filter 123, which removes fine particles from the stormwater ahead of dry well 40, completing the treatment of the stormwater thereby forming treated stormwater exiting fine particle filter 123. When fine particle filter 123 is sufficiently full of stormwater, the treated stormwater, i.e. the stormwater treated by hydrodynamic filter 120, petrochemical filter 121, chemical filter 122, and fine particle filter 123, spills into and through pipe 160 from fine particle filter 123 to chamber 89 of tank 80e and spills downwardly by gravity into chamber 89 of tank 80e from pipe 160.

Chamber 89 of tank 80e is a catch basin enclosed by tank 80e that receives treated stormwater from fine particle filter 123 via pipe 160. Treated stormwater applied to chamber 89 of tank 80e enters dry well 40 by gravity through inlet 42, and dry well 40 gravity feeds the treated stormwater from chamber 89 of tank 80e to outlet 45 in vadose zone 25. The treated stormwater generated by system 115 enters vadose zone 25 from outlet 45 of dry well 40, which automatically and naturally percolates downwardly through vadose zone 25 from outlet 45 of dry well 40 to water table 26 and into underlying aquifer 27 for supplying/replenishing/recharging aquifer 27 below water table 26 with the treated stormwater, in accordance with the principle of the invention. Surface stormwater flows continues to flow through the various chambers 89 of tanks 80a-80e and through system 115 enclosed therein, and dry well continues to gravity feed treated stormwater from chamber 89 of tank 80e to outlet 45 for continued replenishment of the underlying aquifer 27 with the treated stormwater as long a surface stormwater flows into tank structure 50 through inlet 110.

In installation 20, surface stormwater flows downstream through system 115 from hydrodynamic separator 120 to petrochemical filter 121 to chemical filter 122 and finally to fine particle filter 123. Again, the position of petrochemical filter 121 and chemical filter 122 can be reversed if so desired.

The person having ordinary skill in the art will readily appreciate that an exemplary stormwater collection, treatment, and aquifer replenishment installation 20 shown and described in connection with FIGS. 1-7 is disclosed, which provides a useful, cost-effective, and efficient alternative to conventional stormwater management techniques, and which eliminates the need for stormwater collection basins, such as retention basins, detention basins, and infiltration basins, and while at the same time advantageously treats surface stormwater and is coupled to supply/replenish/recharge an aquafer with the treated stormwater. Depending on particular needs or water management requirements, installation 20 can be scaled as needed to accommodate anticipated stormwater runoff in the particular region where installation 20 is installed. Furthermore, since installation 20 is installed underground, it essentially occupies little if any open space, other than the manhole covers, in accordance with the principle of the invention at ground level.

According to one aspect, a stormwater collection, treatment, and aquifer replenishment installation 20 constructed and arranged in accordance with the principle of the invention includes stormwater drain 30 for receiving surface stormwater, dry well 40 downwardly extending underground to outlet 45 in vadose zone 25 proximate to water table 26 over aquifer 27, tank structure 50 at least partially disposed underground and coupled with stormwater drain 30 and dry well 40 in stormwater communication, stormwater treatment system 115 enclosed within tank structure 50 between stormwater drain 30 and dry well 40 for converting surface stormwater into treated stormwater, tank structure 50 for receiving and conducting surface stormwater from stormwater drain 30 to stormwater treatment system 115, and dry well 40 for receiving and gravity feeding treated stormwater generated by system 115 from tank structure 50 to outlet 45. System 115 includes hydrodynamic separator 120 and fine particle filter 123, and additionally includes petrochemical filter 121 and chemical filter 122 in a particular embodiment. Hydrodynamic separator 120 is in stormwater communication with stormwater drain 30, one of petrochemical filter 121 and chemical filter 122 is in stormwater communication with hydrodynamic separator 121, the other one of petrochemical filter 121 and chemical filter 122 is in stormwater communication with the one of the petrochemical filter 121 and the chemical filter 122, and fine particle filter 123 is in stormwater communication with the other one of the petrochemical filter 121 and the chemical filter 122, and dry well 40. Tank structure 50 defines aboveground walk 105 for pedestrians. Installation 20 further includes at least one manhole 100 to within tank structure 50 through walk 105, and at least one manhole cover 101 movable between a closed position to close the at least one manhole 100 and an open position to open the at least one manhole 100. Tank structure 50 is formed of material having rigid and load-bearing material characteristics, such as at least one of concrete, cast iron, steel, and polymer plastic.

According to another aspect of the invention, a stormwater collection, treatment, and aquifer replenishment installation 20 constructed and arranged in accordance with the principle of the invention includes stormwater drain 30 for receiving surface stormwater, dry well 40 downwardly extending underground to outlet 45 in vadose zone 25 proximate to water table 26 over aquifer 27, and tanks 80a-80e. Tanks 80a-80e are at least partially disposed underground, are separate from one another, and are coupled in series with stormwater drain 30 and dry well 40 in stormwater communication. Stormwater treatment system 115 is enclosed within tanks 80a-80e between stormwater drain 30 and dry well 40 for converting surface stormwater into treated stormwater, and dry well 40 is for receiving and gravity feeding treated stormwater generated by system 115 to outlet 45. System 115 includes stormwater treatment components coupled in series in stormwater communication between stormwater drain 30 and dry well 40. These stormwater treatment components are different from one another, and are each enclosed in one of tanks 80a-80e. The stormwater treatment components of system 115 include hydrodynamic separator 120 and fine particle filter 123, and additionally includes petrochemical filter 121 and chemical filter 122 in a particular embodiment. Hydrodynamic separator 120 is enclosed in a first one of tanks 80a-80e in stormwater communication with stormwater drain 30, one of petrochemical filter 121 and chemical filter 122 is enclosed within a second one of tanks 80a-80e in stormwater communication with hydrodynamic separator 120, the other one of petrochemical filter 121 and chemical filter 122 is enclosed within a third one of tanks 80a-80e in stormwater communication with the one of petrochemical filter 121 and chemical filter 122, fine particle filter 123 is enclosed within a fourth one of tanks 80a-80e in stormwater communication with the other one of petrochemical filter 121 and chemical filter 122, and catch basin 89 is enclosed within a fifth one of tanks 80a-80e in stormwater communication with fine particle filter 123 and dry well 40. Dry well 40 is for receiving and gravity feeding treated stormwater generated by system 115 from catch basin 89 to outlet 45. Each of tanks 80a-80e defines an aboveground walk section 90a. The first one of tanks 80a-80e includes at least one manhole 100 to within the first one of tanks 80a-80e through walk section 90a of the first one of tanks 80a-80e, and manhole cover 101 movable between a closed position to close the at least one manhole 100 to within the first one of tanks 80a-80e and an open position to open the at least one manhole 100 to within the first one of tanks 80a-80e. The second one of tanks 80a-80e includes at least one manhole 100 to within the second one of tanks 80a-80e through the walk section 90a of the second one of tanks 80a-80e, and manhole cover 101 movable between a closed position to close the at least one manhole 100 to within the second one of tanks 80a-80e and an open position to open the at least one manhole 100 to within the second one of tanks 80a-80e. The third one of tanks 80a-80e includes at least one manhole 100 to within the third one of tanks 80a-80e through the walk section 90a of the third one of tanks 80a-80e, and manhole cover 101 movable between a closed position to close the at least one manhole 100 to within the third one of tanks 80a-80e and an open position to open that at least one manhole 100 to within the third one of tanks 80a-80e. The fourth one of tanks 80a-80e includes at least one manhole 100 to within the fourth one of tanks 80a-80e through the walk section 90a of the fourth one of tanks 80a-80e, and manhole cover 101 movable between a closed position to close the at least one manhole 100 to within the fourth one of tanks 80a-80e and an open position to open the at least one manhole 100 to within the fourth one of tanks 80a-80e. The fifth one of tanks 80a-80e includes at least one manhole 100 to within the fifth one of tanks 80a-80e through the walk section 90a of the fifth one of tanks 80a-80e, and manhole cover 101 movable between a closed position to close the at least one manhole 100 to within the fifth one of tanks 80a-80e and an open position to open the at least one manhole 100 to within the fifth one of tanks 80a-80e. Each of tanks 80a-80e is formed of a material having rigid and load-bearing material characteristics. The material includes at least one of reinforced concrete, cast iron, steel, and polymer plastic. The walk sections 90a cooperate to define an aboveground walk 105 for pedestrians.

According to yet another aspect of the invention, a stormwater collection, treatment, and aquifer replenishment installation 20 constructed and arranged in accordance with the principle of the invention includes stormwater drain 30 through curb 60 built along side 71 of impervious surface 70, such as a street or a parking lot, to form a part of gutter 61, stormwater drain 30 for receiving surface stormwater, dry well 40 downwardly extending underground to outlet 45 in vadose zone 25 proximate to water table 26 over aquifer 27, tank structure 50 at least partially disposed underground and coupled with the stormwater drain 30 and the dry well 40 in stormwater communication, and stormwater treatment system 115 enclosed within tank structure 50 between stormwater drain 30 and dry well 40 for converting surface stormwater into treated stormwater. Tank structure 50 is for receiving and conducting surface stormwater from stormwater drain 30 to stormwater treatment system 115. Dry well 40 is for receiving and gravity feeding treated stormwater from tank structure 50 to outlet 45. Stormwater treatment system 115 includes stormwater treatment components coupled in series in stormwater communication between stormwater drain 30 and dry well 40. System includes hydrodynamic separator 120 and fine particle filter 123, and in a particular embodiment additionally includes petrochemical filter 121 and chemical filter 122. Hydrodynamic separator 120 is in stormwater communication with stormwater drain 30, one of petrochemical filter 121 and chemical filter 122 is in stormwater communication with hydrodynamic separator 120, the other one of petrochemical filter 121 and chemical filter 122 is in stormwater communication with the one of petrochemical filter 121 and chemical filter 122, and fine particle filter 123 is in stormwater communication with the other one of petrochemical filter 121 and chemical filter 122, and dry well 40. An aboveground sidewalk 106 for pedestrians is built along side 71 of impervious surface 70, and tank structure 50 defines walk 105 forming a part of sidewalk 106. Installation 20 further includes at least one manhole 100 to within tank structure 50 through walk 105 of tank structure 50 forming the part of sidewalk 106, and manhole cover 101 movable between a closed position to close the at least one manhole 100 and an open position to open the at least one manhole 100. Tank structure 50 is formed of a material having rigid and load-bearing material characteristics. The material includes at least one of reinforced concrete, cast iron, steel, and polymer plastic.

According to still another aspect of the invention, a stormwater collection, treatment, and aquifer replenishment installation 20 constructed and arranged in accordance with the principle of the invention includes stormwater drain 30 through curb 60 built along side 71 of impervious surface 70, such as a street or parking lot, to form a part of gutter 61, stormwater drain 30 for receiving surface stormwater, dry well 40 downwardly extending underground to outlet 45 in vadose zone 25 proximate to water table 26 over aquifer 27, and tanks 80a-80e. Tanks 80a-80e are at least partially disposed underground, are separate from one another, and are coupled in series with stormwater drain 30 and dry well 40 in stormwater communication. Stormwater treatment system 115 is enclosed within tanks 80a-80e between stormwater drain 30 and dry well 40 for converting surface stormwater into treated stormwater. System 115 includes stormwater treatment components coupled in series in stormwater communication between stormwater drain 30 and dry well 40, wherein the stormwater treatment components are each enclosed in one of tanks 80a-80e. System 115 includes hydrodynamic separator 120 and fine particle filter 123, and additionally includes petrochemical filter 121 and chemical filter 122 in a particular embodiment. Hydrodynamic separator 120 is enclosed in a first one of tanks 80a-80e in stormwater communication with stormwater drain 30, one of petrochemical filter 121 and chemical filter 122 is enclosed within a second one of tanks 80a-80e in stormwater communication with hydrodynamic separator 120, the other one of petrochemical filter 121 and chemical filter 122 is enclosed within a third one of tanks 80a-80e in stormwater communication with the one of the petrochemical filter 121 and chemical filter 122, a fine particle filter 123 is enclosed within a fourth one of tanks 80a-80e in stormwater communication with the other one of petrochemical filter 121 and chemical filter 122, and catch basin 89 is enclosed within a fifth one of tanks 80a-80e in stormwater communication with fine particle filter 123 and dry well 40. Dry well 40 is for receiving and gravity feeding treated stormwater from system 115 at catch basin 89 to outlet 45. Aboveground sidewalk 106 for pedestrians is built along side 71 of impervious surface 70, and each of tanks 80a-80e defines walk 105 forming a part of sidewalk 106. The first one of tanks 80a-80e includes at least one manhole 100 to within the first one of tanks 80a-80e through the walk section 90a of the first one of tanks 80a-80e, and manhole cover 101 movable between a closed position to close the at least one manhole 100 to within the first one of tanks 80a-80e and an open position to open the at least one manhole 100 to within the first one of tanks 80a-80e. The second one of tanks 80a-80e includes at least one manhole 100 to within the second one of tanks 80a-80e through the walk section 90a of the second one of tanks 80a-80e, and manhole cover 101 movable between a closed position to close the at least one manhole 100 to within the second one of tanks 80a-80e and an open position to open the at least one manhole 100 to within the second one of tanks 80a-80e. The third one of tanks 80a-80e includes at least one manhole 100 to within the third one of tanks 80a-80e through walk section 90a of the third one of tanks 80a-80e, and manhole cover 101 movable between a closed position to close the at least one manhole 100 to within the third one of tanks 80a-80e and an open position to open the at least one manhole 100 to within the third one of tanks 80a-80e. The fourth one of tanks 80a-80e includes at least one manhole 100 to within the fourth one of tanks 80a-80e through walk section 90a of the fourth one of tanks 80a-80e, and manhole cover 101 movable between a closed position to close the at least one manhole 100 to within the fourth one of tanks 80a-80e and an open position to open the at least one manhole 100 to within the fourth one of tanks 80a-80e. The fifth one of tanks 80a-80e includes at least one manhole 100 to within the fifth one of tanks 80a-80e through walk section 90a of the fifth one of tanks 80a-80e, and manhole cover 101 movable between a closed position to close the at least one manhole 100 to within the fifth one of tanks 80a-80e and an open position to open the at least one manhole 100 to within the fifth one of tanks 80a-80e. Each of tanks 80a-80e is formed of a material having rigid and load-bearing material characteristics. The material includes at least one of reinforced concrete, cast iron, steel, and polymer plastic.

In an installation 20 constructed and arranged in accordance with the principle of the invention, periodic cleaning and maintenance of the various chambers 89 of the various tanks 80a-80e will be required. It is advantageous that each tank 80 of tank structure 50 is provided with a removable manhole cover 101, which can be removed for enabling a workman to selectively enter the various chambers 89 of tank structure 50 through the various manholes 100 for cleaning and maintenance of the various chambers 89 and the equipment therein, according to the principle of the invention. Further, an installation 20 constructed and arranged in accordance with the principle of the invention can be installed as a new construction concurrently with the construction of curb 60, gutter 61, impervious surface 70, and sidewalk 106. An installation 20 constructed and arranged in accordance with the principle of the invention can also be installed with an existing curb 60, gutter 61, and impervious surface 70 construction.

In installation 20, stormwater drain 30 and aquafer 27 are operatively coupled entirely by the structure of installation 20 in an unbroken connection from inlet 110 of tank 80a to outlet 45 of dry well 40 proximate to aquifer 27, and not via the ground or other ground material or ground fill material exteriorly of installation 20 between stormwater drain 30 and outlet 45 of drywell 40 to aquifer 27. Having provided/installed an installation constructed and arranged in accordance with the principle of the invention coupling tank structure 50 with stormwater drain 30 and dry well 40 at upstream and downstream ends A and B, respectively, of tank structure 50 in stormwater communication, exemplary methods of collecting, treating, and aquifer replenishment methods include surface stormwater entering tank structure 50 at upstream end A, the stormwater flowing through system 115 enclosed in tank structure from upstream end A to downstream end of tank structure 50, system 115 converting the stormwater from untreated stormwater to treated stormwater in response, the treated stormwater being of improved quality compared to the surface stormwater entering tank structure 50 at upstream end A, and dry well 40 receiving the treated stormwater generated by system 115 at downstream end B of tank structure and gravity-feeding the treated stormwater from tank structure 50 at downstream end B of tank structure 50 to outlet 45, and the treated stormwater generated by system 115 advantageously entering vadose zone 25 from outlet 45 of dry well 40 and automatically, naturally, and advantageously percolating downwardly through vadose zone 25 from outlet 45 of dry well 40 to water table 26 and into underlying aquifer 27 thereby advantageously and positively supplying/replenishing/recharging aquifer 27 below water table 26 with the treated stormwater, according to the principle of the invention.

II

Figure 8:
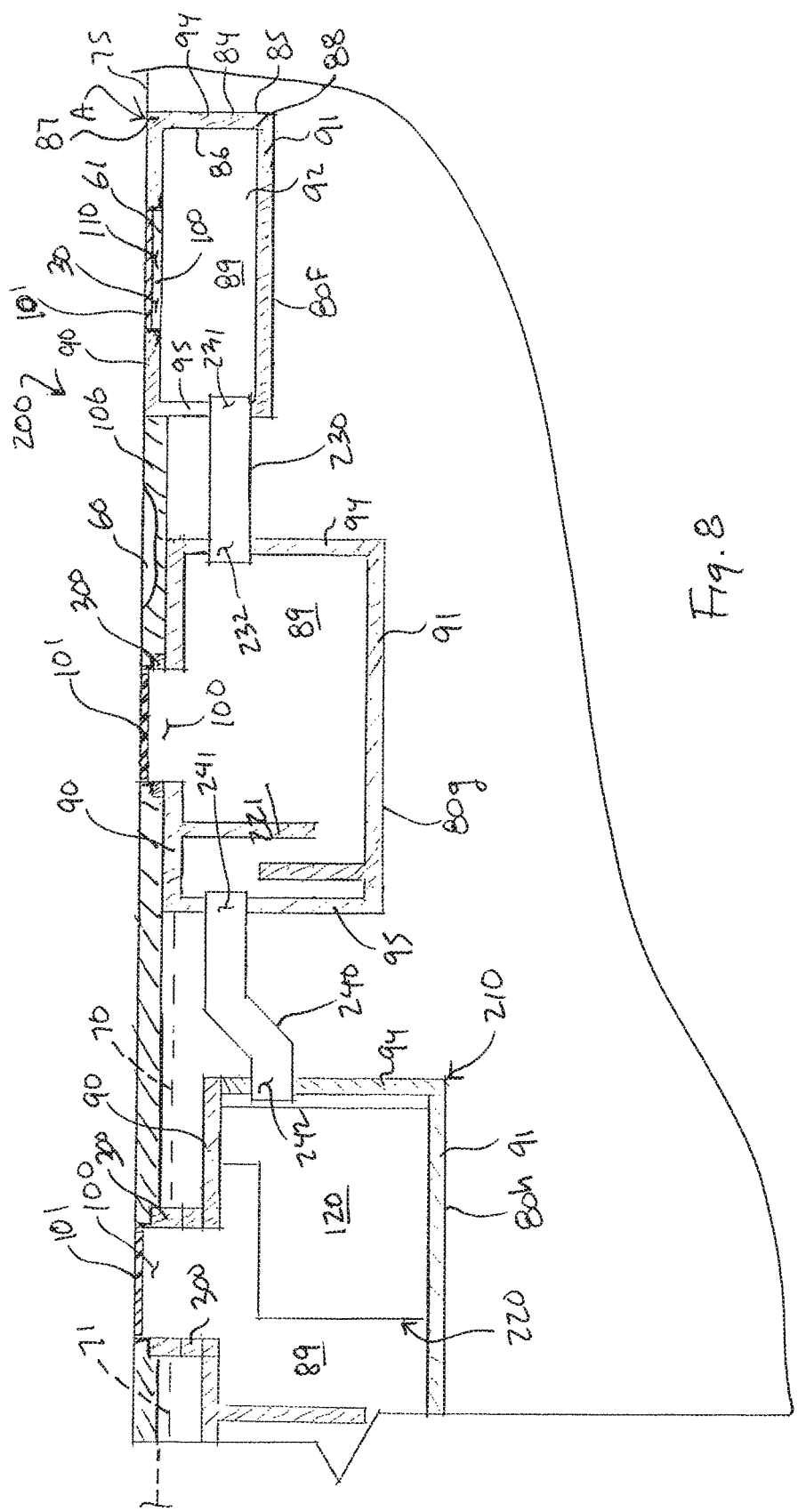
Figure 9:
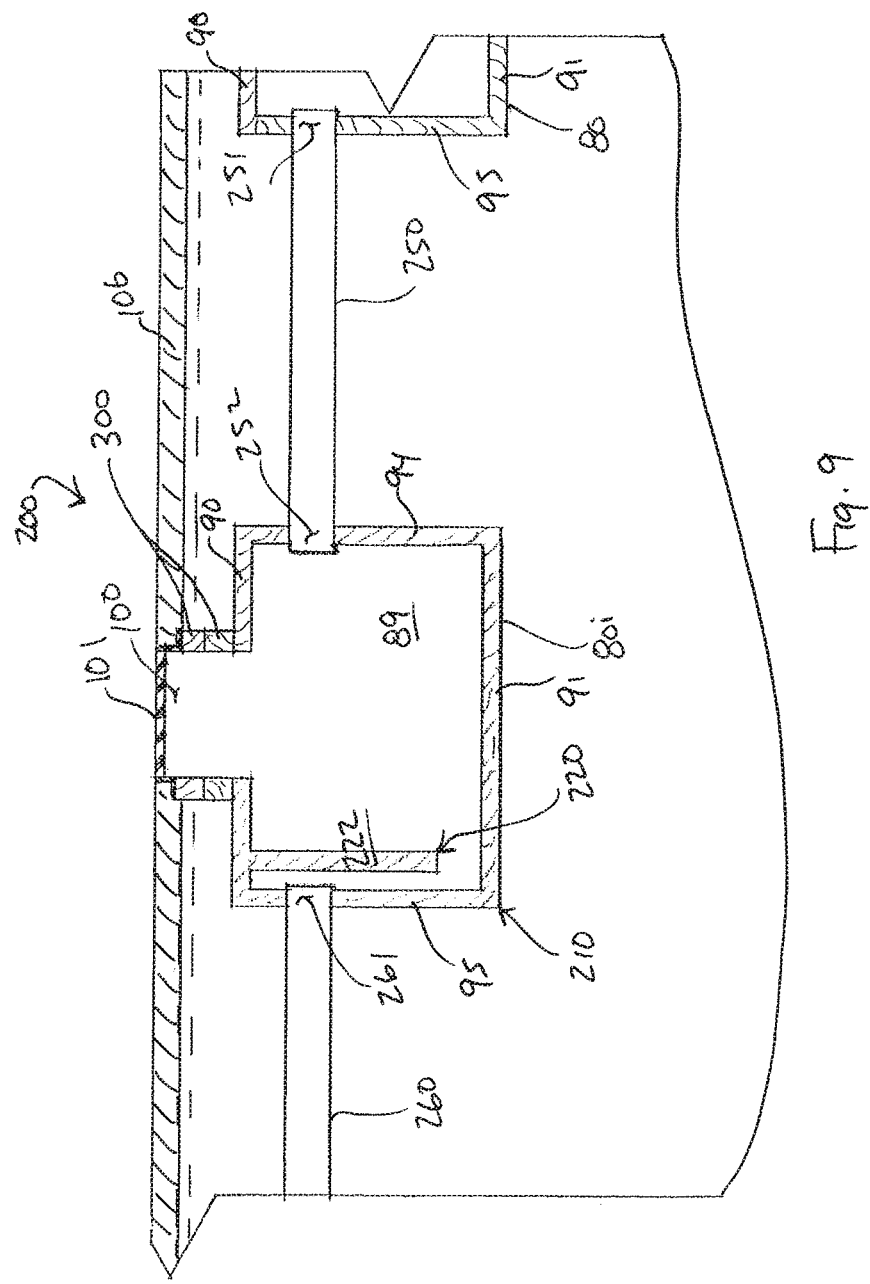

Reference is now directed to FIGS. 8-10, which illustrate respective sections of an alternate embodiment of a stormwater collection, treatment, and aquifer replenishment installation 200 constructed and arranged in accordance with the principle of the invention. Like installation 20, installation 200 is a useful and efficient alternative to conventional stormwater management techniques discussed above, especially commonly-used retention basins, detention basins, and infiltration basins and the various problems associated therewith. In common with installation 20, installation 200 shares stormwater drain 30 in FIG. 8 for receiving surface stormwater, and dry well 40 in FIG. 10 downwardly extending underground to outlet 45 proximate to aquifer 27, namely, proximate to water table 26 over an underlying aquifer 27, and an alternate embodiment of a tank structure 210 coupled with stormwater drain 30 and dry well 40 in stormwater communication, and an alternate embodiment of a stormwater treatment system enclosed within tank structure 210 between stormwater drain 30 and dry well 40 for converting surface stormwater into treated stormwater. Tank structure 210 is for receiving and conducting surface stormwater from stormwater drain 30 to the stormwater treatment system enclosed within tank structure 210. Dry well 40 is for receiving and gravity feeding treated stormwater generated by the stormwater treatment system of installation 20 from tank structure 210 to outlet 45 in vadose zone 25. The stormwater treatment system is designed to separate, treat, and/or remediate mixed debris, sands, sediment, entrained and dissolved chemical, petrochemical, biological and other debris/contaminants/pollutants from surface stormwater. i.e. untreated stormwater, entering the tank structure through stormwater drain 30 before it is gravity fed as treated stormwater to aquifer 27 via dry well 40 for replenishment purposes. Dry well 40 extends downwardly underground to outlet 45 in vadose zone 25 above and proximate to water table 26 over underlying aquifer 27. Instead of diverting the treated stormwater to adjacent water courses, such as rivers, streams, creeks, canals, and lakes, the treated stormwater generated by the stormwater treatment system advantageously enters vadose zone 25 from outlet 45 of dry well 40, which automatically, naturally, and advantageously percolates downwardly through vadose zone 25 from outlet 45 of dry well 40 to water table 26 and into underlying aquifer 27 for advantageously supplying/replenishing/recharging aquifer 27 below water table 26 with the treated stormwater, according to the principle of the invention. The stormwater treatment system of installation 200 between stormwater drain 30 and dry well 40 improves the quality of the untreated, surface stormwater entering installation 200 before it is applied as improved-quality or treated stormwater to dry well 40, the improved-quality or treated stormwater being the subtraction of debris and contaminant components as described herein from the surface stormwater entering installation 200.

Stormwater drain 30 in installation 200 is specifically positioned at a drainage point for receiving surface stormwater. In common with installation 20, in installation 200 stormwater drain 30 is identically disposed proximate to ground level for receiving surface stormwater from the previously-described impervious surface referenced at 70 in connection with installation 20 of a type commonly found in developed areas, such as a street, a parking lot, or other impervious surface disposed proximate to ground level defined here by land or ground surface as described and shown at reference numeral 75 in installation 20.

Stormwater drain 30 in installation 200 is the standard stormwater drain formed through standard curb 60 in FIG. 8 built proximate to ground level 75 in FIG. 8 along side 71 of impervious surface 70 shown and described in installation 20 to form part of gutter 61. The previously-described impervious surface, impervious surface 70 described in in connection with installation 20, is disposed proximate to ground level. Ground-level curbs, like curb 60, are commonly built next to streets and parking lots, two forms of impervious surfaces commonly found in developed areas. Accordingly, in exemplary embodiments impervious surface 70 is a standard street in one embodiment, and is a standard parking lot in another embodiment. Accordingly, and in common with installation 20, the described impervious surface in connection with installation 200 is the standard impervious surface commonly found in urban and developed areas, such as a street or a parking lot in exemplary embodiments, along the sides of which curbs are customarily built. Curb 60, an edging of concrete, is a standard curb built alongside streets and parking lots. Gutter 61, a low area, trough, or groove of concrete to carry off surface water from the impervious surface, is the standard gutter commonly built with curbs alongside impervious surfaces in developed area, including streets and parking lots.

Tank structure 210 that houses the stormwater treatment system of installation 20 is at least partially disposed underground, i.e. below land or ground surface denoted at 75 in FIG. 8, adjacent to and along curb 60 on the opposite side of curb 60 as in installation 20. Tanks 80f-80l form tank structure 210 of installation 200 and are set into an appropriate excavation, dug by excavation equipment, along the opposite side of curb 60 from which the impervious surface is located, and which is appropriately backfilled with excavated material in a customary manner. Before installing tanks 80f-80l into the excavation, dry well 40, the conventional underground structure that disposes of treated stormwater, is conventionally installed underground using known techniques from inlet 42 in FIG. 10 at the bottom of the excavation below land surface 75 to outlet 45 in vadose zone 25 above and proximate to water table 26 over an underlying aquifer 27. Dry well 40 is formed by standard dry well piping extending from inlet 42 to outlet 45. Having formed the appropriate excavation and installed dry well 40, tanks 80f-80l forming tank structure 210 are set into the excavation over dry well 40, tank structure 210 is appropriately coupled with stormwater drain 30 and dry well 40 in stormwater communication, and the excavation is appropriately backfilled.

Tanks 80f-80l are coupled together in series in stormwater communication and cooperate to form tank structure 210, according to the principle of the invention. Tanks 80f-80l are, like the previously-described tank structure 50, modular units each fashioned of material having rigid, load-bearing, and water-impervious material characteristics, such as reinforced concrete, cast iron, steel, polymer plastic, or other chosen fabricated material or combination of materials. In common with tank structure 50, each one of tanks 80f-80l is hollow container having a selected horizontal and vertical dimension, typically being from eight to ten feet deep, four to twelve feet wide, and four to sixteen feet long. Tanks 80f-80l can be the same size, or differently sized. When fashioned of reinforced concrete, the walls of each of tanks 80f-80l are approximately 4-6 inches thick. When fashioned of cast iron, steel, or polymer plastic, the walls of each of tanks 80f-80l are approximately ¾-1 inch thick. Accordingly, each one of tanks 80f-80l is a substantial, strong, rugged, fashioned of water-impervious material, and designed to have a long, useful lifespan. Tanks 80f-80l can each be integrally formed, or formed of a plurality of affixed parts.

Referring to FIG. 8, tank 80f, in common with the previously-described tank 80a, shares continuous sidewall 84, including axially spaced parallel front wall 92 and back wall 93 (not shown) and axially spaced parallel side walls 94 and 95, and having outer surface 85, inner surface 86, upper edge 87, and lower edge 88, horizontal top wall 90, horizontal bottom wall 91, volume or chamber 89 defining a catch basin, manhole 100 from sidewalk 106 proximate to ground surface 75 to within chamber 89, and manhole cover 101. The remaining tanks 80g-80l are the same as tank 80a to the extent described, and are different from one another to the extent that they vary in size. Accordingly, the previous discussion of tank 80f applies equally to each of tanks 80g-80l and common reference characters are used for the various tanks of installation 20 as appropriate throughout the balance of this specification. Tanks 80f-80l can vary in size and shape.

Tanks 80f-80l are separate from one another, and are arranged spaced-apart in series, side wall 95 to sidewall 94, from tank 80f, the upstream tank of tank structure 210, to tank 80l, the downstream tank of tank structure 210, in a horizontal direction from tank 80f coupled in stormwater communication with stormwater drain 30 to tank 80l coupled in stormwater communication with dry well 40, and extend upright from the various bottom walls 91 to the various top walls 90. Tanks 80f-80l are arranged spaced-apart in series in a horizontal direction from tank 80f, to tank 80g, to tank 80h, to tank 80i, to tank 80j, to tank 80k, and finally to tank 80l, in which tank 80f is the upstream tank, tank 80l is the downstream tank, tanks 80g-80k are the intermediate tanks, the various top walls 90 of tanks 80f-80l are horizontal, the various bottom walls 91 of tanks 80f-80l are horizontal, the various front walls 92 of tanks 80f-80l are upright, the various back walls 93 (not shown) of tanks 80f-80l are upright, sidewall 95 of tank 80f and sidewall 94 of tank 80g are upright, juxtaposed, and parallel to one another, sidewall 95 of tank 80g and sidewall 94 of tank 80h are upright, juxtaposed, and parallel to one another, sidewall 95 of tank 80h and sidewall 94 of tank 80i are upright, juxtaposed, and parallel to one another, sidewall 95 of tank 80j and sidewall 94 of tank 80k are upright, juxtaposed, and parallel to one another, and sidewall 95 of tank 80k and sidewall 94 of tank 80l are upright, juxtaposed, and parallel to one another.

As explained above in connection with FIG. 8, stormwater drain 30 is formed through aboveground curb 60 built proximate to ground level, i.e. ground or land surface 75, along the side of an aboveground impervious surface to form a part of gutter 61. Tanks 80f-80l are at least partially disposed underground in the appropriate backfilled excavation described above, and extend downwardly into the ground from the various top walls 90 to the various bottom walls 91 underground at the bottom of the excavation.

Tanks 80f-80l extend and are disposed underground, from top walls 90 adjacent to land surface 75 and sidewalk 106 to the bottom walls 91, below stormwater drain 30 and under ground surface 75 and sidewalk 106. Sidewalk 106 is optional in installation 200 and need not be associated with installation 200. Accordingly, installation 200 can be a "sidewalk-less" installation. Tanks 80 are coupled in series in stormwater communication from tank 80f coupled in stormwater communication with stormwater drain 30 to tank 80l coupled in stormwater communication with dry well 40.

Tank 80f is the upstream tank of tank structure 210 at an upstream end A of tank structure 210. Tank 80l is the downstream tank of tank structure 210 at a downstream end B of tank structure 210, in which its chamber 89 is a catch basin. Tanks 80g-80k are intermediate tanks coupled in series between tanks 80f and 80l. Stormwater flows in series through the various tanks 80f to 80l from stormwater drain 30 coupled in stormwater communication with tank 80f in FIG. 8 to dry well 40 coupled in stormwater communication with tank 80l in FIG. 10. Curb 60 and gutter 61 concurrently extend along the side of the impervious surface to tank 80f and along the various front walls 92 of tanks 80f-80l from tank 80f to tank 80l and beyond tank 80l identically to installation 20. Curb 60 extends partially downwardly along the front walls 92 of the various tanks 80f-80l from the various top walls 90 to gutter 61, which extends outwardly to the edge of the impervious surface that extends outwardly therefrom, identically to installation 20.

Tank 80f is coupled in stormwater communication with stormwater drain 30 to receive surface stormwater by gravity from stormwater drain 30, tank 80g is coupled in stormwater communication with tank 80f to receive stormwater from tank 80f, tank 80h is coupled in stormwater communication with tank 80g to receive stormwater from tank 80g, tank 80i is coupled in stormwater communication with tank 80h to receive stormwater from tank 80h, tank 80j is coupled in stormwater communication with tank 80i to receive stormwater from tank 80i, tank 80k is coupled in stormwater communication with tank 80j to receive stormwater from tank 80*j*, tank 80*l* is coupled in stormwater communication with tank 80*k* to receive stormwater from tank 80*k*, and dry well 40 is coupled in stormwater communication with tank 80*l* to receive and gravity feed stormwater from tank 80*l* to outlet 45 in vadose zone 25. In FIG. 8, tank 80*f* is formed with the previously-described inlet 110 through front wall 92 adjacent to top wall 90 and between side walls 94 and 95 that is both coextensive and axially aligned with stormwater drain 30. Surface stormwater passes through stormwater drain 30 to inlet 110 and falls/spills downwardly through inlet 110 into chamber 89 below inlet 110 of tank 80*f* and stormwater drain 30. Stormwater treatment system 220 of installation 200 is enclosed within the various tanks 80*f*-80*l* of tank structure 210 between stormwater drain 30 and dry well 40 for receiving surface stormwater and converting the surface stormwater into treated stormwater.

System 220 includes various stormwater treatment components coupled in series in stormwater communication between stormwater 30 drain and dry well 40 for processing surface stormwater into treated stormwater by separating, treating, and/or remediating mixed debris, sands, sediment, entrained and dissolved chemical, petrochemical, biological and other debris/contaminants/pollutants from surface stormwater, i.e. untreated stormwater, before it is gravity fed as treated stormwater to aquifer 27 via dry well 40 for supply/replenishment/recharge purposes. In this embodiment, these stormwater treatment components include the previously-described hydrodynamic separator 120 and fine particle filter 123, and additionally sand and oil interceptor 221, hydrocarbon filter 222, and media filtration system 223. Interceptor 221 is coupled in stormwater communication with stormwater drain 30, hydrodynamic separator 120 is coupled in stormwater communication with interceptor 221, hydrocarbon filter 222 is coupled in stormwater communication with hydrodynamic separator 120, media filtration system 223 is coupled in stormwater communication with hydrocarbon filter 222, fine particle filter 123 is coupled in stormwater communication with media filtration system 223, and dry well 40 is coupled in stormwater communication with fine particle filter 123. Surface stormwater entering tank structure 210 through inlet 110 from stormwater drain 30 is applied in sequence to interceptor 221, which is a standard interceptor for entrapping oil, sand, gravel, and other sediments from the surface stormwater in addition to floating debris such as plastic and glass bottles, cans, grass clippings, twigs, and leaves ahead of hydrodynamic separator 120, hydrodynamic separator 120 for receiving the surface stormwater from interceptor 221 and removing large debris from the stormwater in addition soil and other particles down to fifty microns in size and floating debris that may have escaped interceptor 221 ahead of hydrocarbon filter 222, hydrocarbon filter 222, a standard hydrocarbon filter for receiving the surface stormwater from hydrocarbon separator 120 and removing petroleum and other hydrocarbon contaminants from the surface stormwater ahead of media filtration system 223, media filtration system 223, a standard media filtration system that receives the surface stormwater from hydrocarbon filter 222 and uses beds of sand, peat, shredded tires, foam, crushed glass, geo-textile fabric, anthracite, crushed granite or other material to filter/entrap soil and other particles down to fifteen microns in size from the surface stormwater for stormwater management ahead of fine particle filter 123, and fine particle filter 123 for receiving the stormwater from media filtration system 223 and removing fine suspended particles down to from 75 to 15 micron in size, from the stormwater ahead of dry well 40 thereby forming treated stormwater. In a particular embodiment, media filtration system 223 can be configured to filter organic and inorganic chemical pollutants from the stormwater flowing therethrough. Dry well 40, in turn, is for receiving the treated stormwater from fine particle filter 123 and gravity feeding the treated stormwater downwardly to outlet 45 in vadose zone 25.

Interceptor 221, hydrodynamic separator 120, hydrocarbon filter 222, medial filtration system 223, and fine particle filter 123 are conventional devices well known to the person having ordinary skill in the art, and are particular useful for treating surface stormwater by removing oil and sand and other sediments, solid debris, hydrocarbon contaminants, organic and inorganic contaminants, and fine particles from the surface stormwater to form treated stormwater that is applied to dry well 40. The order of the stormwater treatment components of system 220 is important to ensure that debris/pollutants/contaminants are separated, treated, and/or remediated from the stormwater from the largest to the smallest particles, and to enable an extended life for the stormwater treatment components and dry well 40.

Interceptor 221 is installed and enclosed in chamber 89 of tank 80*g*, hydrodynamic separator 120 is installed and enclosed in chamber 89 of tank 80*h*, hydrocarbon filter 222 is installed and enclosed in chamber 89 of tank 80*i*, media filtration system 223 is installed and enclosed in chamber 89 of tank 80*j*, and fine particle filter 123 is installed and enclosed in chamber 89 of tank 80*k*. Interceptor 221, hydrodynamic separator 120, hydrocarbon filter 222, media filtration system 223, and fine particle filter 123 are each fixed in place within their respective tanks 80*g*-80*k* with bolts, ties, or the like.

Chamber 89 of tank 80*f* is open to inlet 110 in fluid communication with stormwater drain 30. Interceptor 221 and chamber 89 of tank 80*g* are coupled in stormwater communication with chamber 89 of tank 80*f* and thus to stormwater drain 30 via pipe 230, which extends from volume 89 of tank 80*f* through openings 231 and 232 in the respective sidewalls 95 and 94 of tanks 80*f* and 80*g* between the top and bottom walls 90 and 91 of the respective tanks 80*f* and 80*g* to chamber 89 of tank 80*g*. Hydrodynamic separator 120 and chamber 89 of tank 80*h* are coupled in stormwater communication with interceptor 221 and volume 89 of tank 80*h* via pipe 240, which extends from interceptor 221 and volume 89 of tank 80*g* through openings 241 and 242 in the respective sidewalls 95 and 94 of tanks 80*g* and 80*h* between the top and bottom walls 90 and 91 of the respective tanks 80*g* and 80*h* to chamber 89 of tank 80*h*. Hydrocarbon filter 222 and chamber 89 of tank 80*i* are coupled in stormwater communication with hydrodynamic separator 120 and volume 89 of tank 80*h* via pipe 250, which extends from hydrodynamic separator 120 and volume 89 of tank 80*h* through openings 251 and 252 in the respective sidewalls 95 and 94 of tanks 80*h* and 80*i* between the top and bottom walls 90 and 91 of the respective tanks 80*h* and 80*i* to chamber 89 of tank 80*i*. Media filtration system 223 and chamber 89 of tank 80*j* are coupled in stormwater communication with hydrocarbon filter 222 and volume 89 of tank 80*i* via pipe 260, which extends from hydrocarbon filter 222 and volume 89 of tank 80*i* through openings 261 and 262 in the respective sidewalls 95 and 94 of tanks 80*i* and 80*j* between the top and bottom walls 90 and 91 of the respective tanks 80*i* and 80*j* to chamber 89 of tank 80*j*. Fine particle filter 123 and chamber 89 of tank 80*k* are coupled in stormwater communication with media filtration system 223 and volume 89 of tank 80*j* via pipe 270, which extends from media filtration system 223 and volume 89 of tank 80*j* through openings 271 and 272 in the respective sidewalls 95 and 94 of tanks 80j and 80k between the top and bottom walls 90 and 91 of the respective tanks 80j and 80k to chamber 89 of tank 80k. Dry well 40 and chamber 89 of tank 80l are coupled in stormwater communication with fine particle filter 123 and volume 89 of tank 80k via pipe 280, which extends from fine particle filter 123 and volume 89 of tank 80k through axially-aligned openings 281 and 282 in the respective sidewalls 95 and 94 of tanks 80k and 80l between the top and bottom walls 90 and 91 of the respective tanks 80k and 80l to chamber 89 of tank 80l. Dry well 40 includes underground inlet 42 coupled to outlet/drain 91a formed in bottom wall 91 of tank 80l. Dry well 40 is entirely underground, and extends downwardly underground to outlet 45 in vadose zone 25 above and proximate to water table 26 over underlying aquifer 27. Inlet 42 of dry well 40 at bottom wall 91 of tank 80l is open chamber 89 of tank 80l, which couples dry well 40 to fine particle filter 123 in stormwater communication. Pipes 230, 240, 250, 260, 270, and 280 are fashioned of polymer plastic, copper, or other suitable material commonly used for water pipes, and are fluid sealed to the various openings through which they extend with suitable gaskets or the like.

The installation and assembly of tanks 80f-80l in the excavation described above forms tank structure 210, which contains and encloses system 220 between stormwater drain 30 and inlet 42 to dry well 40. Tanks 80f-80l are preferably prefabricated with their enclosed part of system 220, transported to the chosen excavation and installed therein. The modularity of tanks 80f-80l enables them to be readily picked and moved about separately from one another, and set into the given excavation one after the other, typically with the use of fork lifts and/or other chosen forms of mechanical lifting equipment. If desired, tanks 80f-80l can be assembled onsite and then installed in the chosen excavation, or actually built onsite within the chosen excavation. Manholes 100 of the various tanks 80f-80l enable workman to enter the various chambers 89 for installing system 220 equipment and pipes 230, 240, 250, 260, 270, and 280 therein. As tanks 80f-80l are formed of water impervious material, tanks 80f-80l are water impervious for preventing stormwater leaking through the material of the various tanks 80f-80l to the surrounding environment.

Accordingly, after forming the appropriate excavation and installing dry well 40 extending downwardly underground from inlet 42 at the bottom of the excavation to outlet 45 in vadose zone 25, tanks 80f-80l forming tank structure 210 are set into the excavation over dry well 40 registering stormwater drain 30 with inlet 110 of tank 80f and outlet/drain 91a of tank 80l with inlet 42 of dry well 40, tanks 80f-80l are coupled in stormwater communication via the various pipes 230, 240, 250, 260, 270, and 280, and the excavation is appropriately backfilled.

In the operation of installation 200, surface stormwater enters chamber 89 of tank 80f via stormwater drain 60 and inlet 110 and spills downwardly therefrom into chamber 89 of tank 80f. Tank 80f is a catch basin. When chamber 89 of tank 80f is sufficiently full of stormwater flowing into chamber 89 of tank 80f, the stormwater spills into and through pipe 230 from chamber chamber 89 of tank 80f and spills by gravity downwardly from pipe 230 into chamber 89 of tank 80g.

The stormwater entering chamber 89 of tank 89g from chamber 89 of tank 80f flows through chamber 89 of tank 80g and interceptor 221, which removes oil and sand and other sediments from the surface stormwater ahead of hydrodynamic separator 120. When interceptor 221 and chamber 89 of tank 80g are sufficiently full of stormwater, the stormwater spills into and through pipe 240 from interceptor 221 and chamber 89 of tank 80g to chamber 89 of tank 80h housing hydrodynamic separator 120 and spills by gravity downwardly from pipe 240 into chamber 89 of tank 80h.

The stormwater entering chamber 89 of tank 89h from interceptor 221 and chamber 89 of tank 80g flows through chamber 89 of tank 80h and hydrodynamic separator 120, which removes solid debris from the stormwater, such as leaves, sticks, twigs, rocks, and the like, ahead of hydrocarbon filter 222. When hydrodynamic separator 120 and chamber 89 of tank 80h are sufficiently full of stormwater, the stormwater spills into and through pipe 250 from hydrodynamic separator 120 and chamber 89 of tank 80h to chamber 89 of tank 80i housing hydrocarbon filter 222 and spills by gravity downwardly from pipe 250 into chamber 89 of tank 80i.

The stormwater entering chamber 89 of tank 89i from hydrodynamic separator 120 and chamber 89 of tank 80h flows through chamber 89 of tank 80i and hydrocarbon filter 222, which removes hydrocarbon contaminants from the surface stormwater ahead of media filtration system 223. When hydrocarbon filter 222 and chamber 89 of tank 80i are sufficiently full of stormwater, the stormwater spills into and through pipe 260 from hydrocarbon filter 222 and chamber 89 of tank 80i to chamber 89 of tank 80j housing media filtration system 223 and spills by gravity downwardly from pipe 260 into chamber 89 of tank 80j.

The stormwater entering chamber 89 of tank 89j from hydrocarbon filter 222 and chamber 89 of tank 80i flows through chamber 89 of tank 80j and media filtration system 223, which removes organic and inorganic contaminants from the surface stormwater ahead of fine particle filter 123. When media filtration system 223 and chamber 89 of tank 80j are sufficiently full of stormwater, the stormwater spills into and through pipe 270 from media filtration system 223 and chamber 89 of tank 80j to chamber 89 of tank 80k housing fine particle filter 123 and spills by gravity downwardly from pipe 270 into chamber 89 of tank 80k.

The stormwater entering chamber 89 of tank 89k from media filtration system 223 and chamber 89 of tank 80j flows through chamber 89 of tank 80k and fine particle filter 123, which removes fine particle contaminants from the surface stormwater ahead of chamber 89 of tank 80l completing the treatment of the stormwater thereby forming treated stormwater exiting fine particle filter 123. When fine particle filter 123 and chamber 89 of tank 80k are sufficiently full of stormwater, the treated stormwater, i.e. the stormwater treated by interceptor 221, hydrodynamic filter 120, hydrocarbon filter 222, media filtration system 223, and fine particle filter 123, spills into and through pipe 280 from fine particle filter 123 and chamber 89 of tank 80k to chamber 89 of tank 80l and spills by gravity downwardly from pipe 280 into chamber 89 of tank 80l.

Chamber 89 of tank 80l is a catch basin enclosed by tank 80l that receives treated stormwater from fine particle filter 123 via pipe 280. Treated stormwater applied to chamber 89 of tank 80l enters dry well 40 by gravity through inlet 42, and dry well 40 gravity feeds the treated stormwater from chamber 89 of tank 80l to outlet 45 in vadose zone 25. The treated stormwater generated by system 220 enters vadose zone 25 from outlet 45 of dry well 40, which automatically and naturally percolates downwardly through vadose zone 25 from outlet 45 of dry well 40 to water table 26 and into underlying aquifer 27 for supplying/replenishing/recharging aquifer 27 below water table 26 with the treated stormwater, in accordance with the principle of the invention. Surface stormwater flows continues to flow through the various chambers 89 of tanks 80f-80l and through system 220 enclosed therein, and dry well continues to gravity feed treated stormwater from chamber 89 of tank 80l to outlet 45 for continued replenishment of the underlying aquifer 27 as long a surface stormwater flows into tank structure 210 through inlet 110.

In installation 200, surface stormwater flows downstream through system 220 from interceptor 221, hydrodynamic filter 120, hydrocarbon filter 222, media filtration system 223, and finally to fine particle filter 123.

Tanks 80f-80i and 80k and 80l are each formed with one manhole 100 and one corresponding manhole cover 101, and tank 80j is formed with two manholes 100 and two corresponding manhole covers 101. Depending on the chosen size of each of tanks 80, each of tanks 80a-80l can be formed with one more manholes and corresponding manhole covers. In FIG. 8, top wall 90 and manhole 100 are proximate to ground surface 75 and sidewalk 106. Accordingly, tank 80f is at least partially disposed underground below ground surface 75 and sidewalk 106. The remaining tanks 80g-80l of installation 200 are underground below ground surface 75 and sidewalk 106. Manholes 100 of tanks 80g-80l each incorporate one or more standard grade rings between top wall 90 and manhole 100 in order to set the various manholes 100 proximate to ground surface 75 and sidewalk 106 in this example. In the present example, manholes 100 of tanks 80g and 80l each incorporates one grade ring 300, manholes 100 of tanks 80h and 80i each incorporates two grade rings 300, and manholes 100 of tanks 80j and 80k each incorporates three grade rings 300. A manhole of a tank of an installation constructed and arranged in accordance with the principle of the invention can incorporate any chosen number of grade rings to bring the manhole to ground surface 75 level from the underground tank.

As described above, tanks 80f-80l are separate from one another, are arranged spaced-apart in series, and are coupled in stormwater communication via the various pipes 23, 240, 250, 260, 270, and 280. As a matter of example, the distance between tanks 80f-80l is from 6-15 feet. This distance between tanks 80f-80l can be the same or different depending on the installation and the ground characteristics where tanks 80f-80l are installed.

The person having ordinary skill in the art will readily appreciate that an exemplary stormwater collection, treatment, and aquifer replenishment installation 200 shown and described in connection with FIGS. 8-10 is disclosed, which is designed to manage larger volumes of surface stormwater compared to installation 20, which provides a useful, cost-effective, and efficient alternative to conventional stormwater management techniques, and which eliminates the need for stormwater collection basins, such as retention basins, detention basins, and infiltration basins, and while at the same time advantageously treats surface stormwater and is coupled to supply/replenish/recharge an aquafer with the treated stormwater. Depending on particular needs or water management requirements, installation 200, like previously-described installation 20, can be scaled as needed to accommodate anticipated stormwater runoff in the particular region where installation 200 is installed. Furthermore, since installation 200 is installed underground, it essentially occupies little if any open space, other than the manhole covers, in accordance with the principle of the invention at ground level.

According to one aspect, a stormwater collection, treatment, and aquifer replenishment installation 200 constructed and arranged in accordance with the principle of the invention includes stormwater drain 30 for receiving surface stormwater, dry well 40 downwardly extending underground to outlet 45 in vadose zone 25 proximate to water table 26 over aquifer 27, tank structure 210 at least partially disposed underground and coupled with stormwater drain 30 and dry well 40 in stormwater communication, stormwater treatment system 220 enclosed within tank structure 210 between stormwater drain 30 and dry well 40 for converting surface stormwater into treated stormwater, tank structure 210 for receiving and conducting surface stormwater from stormwater drain 30 to stormwater treatment system 220, and dry well 40 for receiving and gravity feeding treated stormwater generated by system 220 from tank structure 210 to outlet 45. System 220 includes hydrodynamic separator 120 and fine particle filter 123, and additionally includes sand and oil interceptor 221, hydrocarbon filter 222, and media filtration system 223 in a particular embodiment. Interceptor 221 is coupled in stormwater communication with the stormwater drain, hydrodynamic separator 120 is coupled in stormwater communication with interceptor 221, one of hydrocarbon filter 222 and media filtration system 223 and is coupled in stormwater communication with hydrodynamic separator 120, the other one of hydrocarbon filter 222 and media filtration system 223 is coupled in stormwater communication with the one of hydrocarbon filter 222 and media filtration system 223, and fine particle filter 123 is coupled in stormwater communication with the other one of hydrocarbon filter 222 and media filtration system 223, and dry well 40. Installation 200 further includes at least one manhole 100 to within tank structure 210, and at least one manhole cover 101 movable between a closed position to close the at least one manhole 100 and an open position to open the at least one manhole 100. Tank structure 210 is formed of material having rigid and load-bearing material characteristics, such as at least one of concrete, cast iron, steel, and polymer plastic.

According to another aspect of the invention, a stormwater collection, treatment, and aquifer replenishment installation 200 constructed and arranged in accordance with the principle of the invention includes stormwater drain 30 for receiving surface stormwater, dry well 40 downwardly extending underground to outlet 45 in vadose zone 25 proximate to water table 26 over aquifer 27, and tanks 80f-80l. Tanks 80f-80l are at least partially disposed underground, are separate from one another, and are coupled in series with stormwater drain 30 and dry well 40 in stormwater communication. Stormwater treatment system 220 is enclosed within tanks 80f-80l between stormwater drain 30 and dry well 40 for converting surface stormwater into treated stormwater, and dry well 40 is for receiving and gravity feeding treated stormwater generated by system 220 to outlet 45. System 220 includes stormwater treatment components coupled in series in stormwater communication between stormwater drain 30 and dry well 40, wherein the stormwater treatment components are each enclosed in one of tanks 80f-80l. System 220 includes hydrodynamic separator 120 in a first one of tanks 80f-80l and fine particle filter 123 in a second one of tanks 80f-80l, and additionally includes sand and oil interceptor 221 in a third one of tanks 80f-80l, hydrocarbon filter 222 in a fourth one of tanks 80f-80l, and media filtration system 223 in a fifth one of tanks 80f-80l, in a particular embodiment. Interceptor 221 is coupled in stormwater communication with the stormwater drain, hydrodynamic separator 120 is coupled in stormwater communication with interceptor 221, one of hydrocarbon filter 222 and media filtration system 223 and is coupled in stormwater communication with hydrodynamic separator 120, the other one of hydrocarbon filter 222 and media filtration system 223 is coupled in stormwater communication with the one of hydrocarbon filter 222 and media filtration system 223, and fine particle filter 123 is coupled in stormwater communication with the other one of hydrocarbon filter 222 and media filtration system 223, and dry well 40, and catch basin 89 enclosed within a sixth one of tanks 80f-80l in stormwater communication with fine particle filter 123 and dry well 40. Dry well 40 is for receiving and gravity feeding treated stormwater generated by system 220 from catch basin 89 to outlet 45. Tanks 80f-80l each include at least one manhole 100 to therein and at least one manhole cover 101 movable between a closed position to close the at least one manhole 100 and an open position to open the at least one manhole 100. Each of tanks 80f-80l is formed of a material having rigid and load-bearing material characteristics. The material includes at least one of reinforced concrete, cast iron, steel, and polymer plastic.

According to yet another aspect of the invention, a stormwater collection, treatment, and aquifer replenishment installation 200 constructed and arranged in accordance with the principle of the invention includes stormwater drain 30 through curb 60 built along side 71 of impervious surface 70, such as a street or a parking lot, to form a part of gutter 61, stormwater drain 30 for receiving surface stormwater, dry well 40 downwardly extending underground to outlet 45 in vadose zone 25 proximate to water table 26 over aquifer 27, tank structure 210 at least partially disposed underground and coupled with the stormwater drain 30 and the dry well 40 in stormwater communication, and stormwater treatment system 220 enclosed within tank structure 210 between stormwater drain 30 and dry well 40 for converting surface stormwater into treated stormwater. Tank structure 210 is for receiving and conducting surface stormwater from stormwater drain 30 to stormwater treatment system 220. Dry well 40 is for receiving and gravity feeding treated stormwater from tank structure 210 to outlet 45. Stormwater treatment system 220 includes stormwater treatment components coupled in series in stormwater communication between stormwater drain 30 and dry well 40. System 220 includes hydrodynamic separator 120 and fine particle filter 123, and additionally includes sand and oil interceptor 221, hydrocarbon filter 222, and media filtration system 223 in a particular embodiment. Interceptor 221 is coupled in stormwater communication with the stormwater drain, hydrodynamic separator 120 is coupled in stormwater communication with interceptor 221, one of hydrocarbon filter 222 and media filtration system 223 and is coupled in stormwater communication with hydrodynamic separator 120, the other one of hydrocarbon filter 222 and media filtration system 223 is coupled in stormwater communication with the one of hydrocarbon filter 222 and media filtration system 223, and fine particle filter 123 is coupled in stormwater communication with the other one of hydrocarbon filter 222 and media filtration system 223, and dry well 40. Installation 200 further includes at least one manhole 100 to within tank structure 210, and at least one manhole cover 101 movable between a closed position to close the at least one manhole 100 and an open position to open the at least one manhole 100. Tank structure 210 is formed of a material having rigid and load-bearing material characteristics. The material includes at least one of reinforced concrete, cast iron, steel, and polymer plastic.

According to still another aspect of the invention, a stormwater collection, treatment, and aquifer replenishment installation 200 constructed and arranged in accordance with the principle of the invention includes stormwater drain 30 through curb 60 built along side 71 of impervious surface 70, such as a street or parking lot, to form a part of gutter 61, stormwater drain 30 for receiving surface stormwater, dry well 40 downwardly extending underground to outlet 45 in vadose zone 25 proximate to water table 26 over aquifer 27, and tanks 80f-80l. Tanks 80f-80l are at least partially disposed underground, are separate from one another, and are coupled in series with stormwater drain 30 and dry well 40 in stormwater communication. Stormwater treatment system 220 is enclosed within tanks 80f-80l between stormwater drain 30 and dry well 40 for converting surface stormwater into treated stormwater, and dry well 40 is for receiving and gravity feeding treated stormwater generated by system 220 to outlet 45. System 220 includes stormwater treatment components coupled in series in stormwater communication between stormwater drain 30 and dry well 40, wherein the stormwater treatment components are each enclosed in one of tanks 80f-80l. System 220 includes hydrodynamic separator 120 in a first one of tanks 80f-80l and fine particle filter 123 in a second one of tanks 80f-80l, and additionally includes sand and oil interceptor 221 in a third one of tanks 80f-80l, hydrocarbon filter 222 in a fourth one of tanks 80f-80l, and media filtration system 223 in a fifth one of tanks 80f-80l, in a particular embodiment. Interceptor 221 is coupled in stormwater communication with the stormwater drain, hydrodynamic separator 120 is coupled in stormwater communication with interceptor 221, one of hydrocarbon filter 222 and media filtration system 223 and is coupled in stormwater communication with hydrodynamic separator 120, the other one of hydrocarbon filter 222 and media filtration system 223 is coupled in stormwater communication with the one of hydrocarbon filter 222 and media filtration system 223, and fine particle filter 123 is coupled in stormwater communication with the other one of hydrocarbon filter 222 and media filtration system 223, and dry well 40, and catch basin 89 enclosed within a sixth one of tanks 80f-80l in stormwater communication with fine particle filter 123 and dry well 40. Dry well 40 is for receiving and gravity feeding treated stormwater generated by system 220 from catch basin 89 to outlet 45. Tanks 80f-80l each include at least one manhole 100 to therein and at least one manhole cover 101 movable between a closed position to close the at least one manhole 100 and an open position to open the at least one manhole 100. Each of tanks 80f-80l is formed of a material having rigid and load-bearing material characteristics. The material includes at least one of reinforced concrete, cast iron, steel, and polymer plastic.

In an installation 200 constructed and arranged in accordance with the principle of the invention, periodic cleaning and maintenance of the various chambers 89 of the various tanks 80f-80l will be required. It is advantageous that each tank 80 of tank structure 210 is provided with at least one removable manhole cover 101, which can be removed for enabling a workman to selectively enter the various chambers 89 of tank structure 210 through the various manholes 100 for cleaning and maintenance of the various chambers 89 and the equipment therein, according to the principle of the invention. Further, an installation 200 constructed and arranged in accordance with the principle of the invention can be installed as a new construction concurrently with the construction of curb 60, gutter 61, and impervious surface 70. An installation 200 constructed and arranged in accordance with the principle of the invention can also be installed with an existing curb 60, gutter 61, and impervious surface 70 construction.

In installation 200, stormwater drain 30 and aquafer 27 are operatively coupled entirely by the structure of installation 200 in an unbroken connection from inlet 110 of tank 80f to outlet 45 of dry well 40 proximate to aquifer 27, and not via the ground or other ground material or ground fill material exteriorly of installation 200 between stormwater drain 30 and outlet 45 of drywell 40 to aquifer 27. Having provided/installed installation 200 constructed and arranged in accordance with the principle of the invention coupling tank structure 210 with stormwater drain 30 and dry well 40 at upstream and downstream ends A and B, respectively, of tank structure 210 in stormwater communication, exemplary methods of collecting, treating, and aquifer replenishment methods include surface stormwater entering tank structure 210 at upstream end A, the stormwater flowing through system 220 enclosed in tank structure from upstream end A to downstream end of tank structure 210, system 220 converting the stormwater from untreated stormwater to treated stormwater in response, the treated stormwater being of improved quality compared to the surface stormwater entering tank structure 210 at upstream end A, and dry well 40 receiving the treated stormwater generated by system 220 at downstream end B of tank structure and gravity-feeding the treated stormwater from tank structure 210 at downstream end B of tank structure 210 to outlet 45, and the treated stormwater generated by system 220 advantageously entering vadose zone 25 from outlet 45 of dry well 40 and automatically, naturally, and advantageously percolating downwardly through vadose zone 25 from outlet 45 of dry well 40 to water table 26 and into underlying aquifer 27 thereby advantageously and positively supplying/replenishing/recharging aquifer 27 below water table 26 with the treated stormwater, according to the principle of the invention.

III

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A stormwater collection, treatment, and aquifer replenishment installation, comprising:
   a stormwater drain for receiving surface stormwater;
   a tank structure at least partially disposed underground and coupled with the stormwater drain and a dry well in stormwater communication, the dry well extending downwardly underground from the tank structure to an outlet below the tank structure and proximate to a water table over an aquifer;
   a stormwater treatment system enclosed within the tank structure between the stormwater drain and the dry well for converting surface stormwater into treated stormwater;
   the tank structure for conducting surface stormwater to the stormwater treatment system between the stormwater drain and the dry well; and
   the dry well for receiving treated stormwater from the stormwater treatment system and gravity feeding the treated stormwater downwardly underground from the tank structure to the outlet.

2. The stormwater collection, treatment, and aquifer replenishment installation according to claim 1, wherein the stormwater treatment system comprises stormwater treatment components that are different from one another and are coupled in series in stormwater communication between the stormwater drain and the dry well.

3. The stormwater collection, treatment, and aquifer replenishment installation according to claim 2, wherein the stormwater treatment components comprise a hydrodynamic separator and a fine particle filter.

4. The stormwater collection, treatment, and aquifer replenishment installation according to claim 3, wherein the stormwater treatment components additionally comprise a petrochemical filter and a chemical filter.

5. The stormwater collection, treatment, and aquifer replenishment installation according to claim 4, wherein:
   the hydrodynamic separator is coupled in stormwater communication with the stormwater drain;
   one of the petrochemical filter and the chemical filter is coupled in stormwater communication with the hydrodynamic separator;
   the other one of the petrochemical filter and the chemical filter is coupled in stormwater communication with the one of the petrochemical filter and the chemical filter; and
   the fine particle filter is coupled in stormwater communication with the other one of the petrochemical filter and the chemical filter, and the dry well.

6. The stormwater collection, treatment, and aquifer replenishment installation according to claim 3, wherein the stormwater treatment components additionally comprise a sand and oil interceptor, a hydrocarbon filter, and a media filtration system.

7. The stormwater collection, treatment, and aquifer replenishment installation according to claim 6, wherein:
   the sand and oil interceptor is coupled in stormwater communication with the stormwater drain;
   the hydrodynamic separator is coupled in stormwater communication with the sand and oil interceptor;
   the hydrocarbon filter is coupled in stormwater communication with the hydrodynamic separator;
   the media filtration system is coupled in stormwater communication with the hydrocarbon filter; and
   the fine particle filter is coupled in stormwater communication with the media filtration system, and the dry well.

8. The stormwater collection, treatment, and aquifer replenishment installation according to claim 1, wherein the tank structure defines an aboveground walk for pedestrians.

9. The stormwater collection, treatment, and aquifer replenishment installation according to claim 1, further comprising:
   at least one manhole to within the tank structure; and
   a manhole cover movable between a closed position to close the at least one manhole and an open position to open the at least one manhole.

10. A stormwater collection, treatment, and aquifer replenishment installation, comprising:
    a stormwater drain for receiving surface stormwater;
    tanks at least partially disposed underground, the tanks are separate from one another and are coupled in series in stormwater communication from the stormwater drain to the dry well;

a stormwater treatment system enclosed within the tanks between the stormwater drain and a dry well for converting surface stormwater into treated stormwater, the dry well extending downwardly underground from the tanks to an outlet below the tanks and proximate to a water table over an aquifer;

the tanks for conducting surface stormwater to the stormwater treatment system between the stormwater drain and the dry well; and the dry well for receiving treated stormwater from the stormwater treatment system and gravity feeding the treated stormwater downwardly underground from the tanks to the outlet.

11. The stormwater collection, treatment, and aquifer replenishment installation according to claim 10, wherein the stormwater treatment system comprises stormwater treatment components that are different from one another and are coupled in series in stormwater communication between the stormwater drain and the dry well, wherein the stormwater treatment components are each enclosed in one of the tanks.

12. The stormwater collection, treatment, and aquifer replenishment installation according to claim 11, wherein the stormwater treatment components comprise a hydrodynamic separator and a fine particle filter.

13. The stormwater collection, treatment, and aquifer replenishment installation according to claim 12, wherein the stormwater treatment components additionally comprise a petrochemical filter and a chemical filter.

14. The stormwater collection, treatment, and aquifer replenishment installation according to claim 13, wherein:
the hydrodynamic separator is coupled in stormwater communication with the stormwater drain;
one of the petrochemical filter and the chemical filter is coupled in stormwater communication with the hydrodynamic separator;
the other one of the petrochemical filter and the chemical filter is coupled in stormwater communication with the one of the petrochemical filter and the chemical filter; and
the fine particle filter is coupled in stormwater communication with the other one of the petrochemical filter and the chemical filter, and the dry well.

15. The stormwater collection, treatment, and aquifer replenishment installation according to claim 12, wherein the stormwater treatment components additionally comprise a sand and oil interceptor, a hydrocarbon filter, and a media filtration system.

16. The stormwater collection, treatment, and aquifer replenishment installation according to claim 15, wherein:
the sand and oil interceptor is coupled in stormwater communication with the stormwater drain;
the hydrodynamic separator is coupled in stormwater communication with the sand and oil interceptor;
the hydrocarbon filter is coupled in stormwater communication with the hydrodynamic separator;
the media filtration system is coupled in stormwater communication with the hydrocarbon filter; and
the fine particle filter is coupled in stormwater communication with the media filtration system, and the dry well.

17. The stormwater collection, treatment, and aquifer replenishment installation according to claim 10, wherein each of the tanks defines an aboveground walk section.

18. The stormwater collection, treatment, and aquifer replenishment installation according to claim 17, wherein the walk sections cooperate to define an aboveground walk for pedestrians.

19. The stormwater collection, treatment, and aquifer replenishment installation according to claim 10, wherein each of the tanks further comprises:
at least one manhole to within the tank; and
a manhole cover movable between a closed position to close the at least one manhole and an open position to open the at least one manhole.

20. The stormwater collection, treatment, and aquifer replenishment installation according to claim 10, wherein each said tank is formed of a material having rigid and load-bearing material characteristics.

21. The stormwater collection, treatment, and aquifer replenishment installation according to claim 20, wherein the material comprises at least one of reinforced concrete, cast iron, steel, and polymer plastic.

22. A stormwater collection, treatment, and aquifer replenishment installation, comprising:
a stormwater drain through a curb built along a side of an impervious surface to form a part of a gutter, the stormwater drain for receiving surface stormwater;
a tank structure at least partially disposed underground and coupled with the stormwater drain and a dry well in stormwater communication, the dry well extending downwardly underground from the tank structure to an outlet below the tank structure and proximate to a water table over an aquifer;
a stormwater treatment system enclosed within the tank structure between the stormwater drain and the dry well for converting surface stormwater into treated stormwater;
the tank structure for conducting surface stormwater to the stormwater treatment system between the stormwater drain and the dry well; and
the dry well for receiving treated stormwater from stormwater treatment system and gravity feeding the treated stormwater downwardly underground from the tank structure to the outlet.

23. The stormwater collection, treatment, and aquifer replenishment installation according to claim 22, wherein the stormwater treatment system comprises stormwater treatment components that are different from one another and are coupled in series in stormwater communication between the stormwater drain and the dry well.

24. The stormwater collection, treatment, and aquifer replenishment installation according to claim 23 wherein the stormwater treatment components comprise a hydrodynamic separator and a fine particle filter.

25. The stormwater collection, treatment, and aquifer replenishment installation according to claim 24, wherein the stormwater treatment components additionally comprise a petrochemical filter and a chemical filter.

26. The stormwater collection, treatment, and aquifer replenishment installation according to claim 25, wherein:
the hydrodynamic separator is coupled in stormwater communication with the stormwater drain;
one of the petrochemical filter and the chemical filter is coupled in stormwater communication with the hydrodynamic separator;
the other one of the petrochemical filter and the chemical filter is coupled in stormwater communication with the one of the petrochemical filter and the chemical filter; and the fine particle filter is coupled in stormwater communication with the other one of the petrochemical filter and the chemical filter, and the dry well.

27. The stormwater collection, treatment, and aquifer replenishment installation according to claim 24, wherein the stormwater treatment components additionally comprise a sand and oil interceptor, a hydrocarbon filter, and a media filtration system.

28. The stormwater collection, treatment, and aquifer replenishment installation according to claim 27, wherein:
the sand and oil interceptor is coupled in stormwater communication with the stormwater drain;
the hydrodynamic separator is coupled in stormwater communication with the sand and oil interceptor;
the hydrocarbon filter is coupled in stormwater communication with the hydrodynamic separator;
the media filtration system is coupled in stormwater communication with the hydrocarbon filter; and
the fine particle filter is coupled in stormwater communication with the media filtration system, and the dry well.

29. The stormwater collection, treatment, and aquifer replenishment installation according to claim 22, further comprising:
an aboveground sidewalk for pedestrians built along the side of the impervious surface; and
the tank structure defines a part of the sidewalk.

30. The stormwater collection, treatment, and aquifer replenishment installation according to claim 29, further comprising:
at least one manhole to within the tank structure through the part of the sidewalk; and
a manhole cover movable between a closed position to close the at least one manhole and an open position to open the at least one manhole.

31. A stormwater collection, treatment, and aquifer replenishment installation, comprising:
a stormwater drain through a curb built along a side of an impervious surface to form a part of a gutter, the stormwater drain for receiving surface stormwater;
tanks at least partially disposed underground, the tanks are separate from one another and are coupled in series in stormwater communication from the stormwater drain to a dry well, the dry well extending downwardly underground from the tanks to an outlet below the tanks and proximate to a water table over an aquifer;
a stormwater treatment system enclosed within the tanks between the stormwater drain and the dry well for converting surface stormwater into treated stormwater;
the tanks for conducting surface stormwater to the stormwater treatment system between the stormwater drain and the dry well; and
the dry well for receiving treated stormwater from the stormwater treatment system and gravity feeding the treated stormwater downwardly underground from the tanks to the outlet.

32. The stormwater collection, treatment, and aquifer replenishment installation according to claim 31, wherein the stormwater treatment system comprises stormwater treatment components that are different from one another and are coupled in series in stormwater communication between the stormwater drain and the dry well, wherein the stormwater treatment components are each enclosed in one of the tanks.

33. The stormwater collection, treatment, and aquifer replenishment installation according to claim 32, wherein the stormwater treatment components comprise a hydrodynamic separator and a fine particle filter.

34. The stormwater collection, treatment, and aquifer replenishment installation according to claim 33, wherein the stormwater treatment components additionally comprise a petrochemical filter and a chemical filter.

35. The stormwater collection, treatment, and aquifer replenishment installation according to claim 34, wherein:
the hydrodynamic separator is coupled in stormwater communication with the stormwater drain;
one of the petrochemical filter and the chemical filter is coupled in stormwater communication with the hydrodynamic separator;
the other one of the petrochemical filter and the chemical filter is coupled in stormwater communication with the one of the petrochemical filter and the chemical filter; and
the fine particle filter is coupled in stormwater communication with the other one of the petrochemical filter and the chemical filter, and the dry well.

36. The stormwater collection, treatment, and aquifer replenishment installation according to claim 33, wherein the stormwater treatment components additionally comprise a sand and oil interceptor, a hydrocarbon filter, and a media filtration system.

37. The stormwater collection, treatment, and aquifer replenishment installation according to claim 36, wherein:
the sand and oil interceptor is coupled in stormwater communication with the stormwater drain;
the hydrodynamic separator is coupled in stormwater communication with the sand and oil interceptor;
the hydrocarbon filter is coupled in stormwater communication with the hydrodynamic separator;
the media filtration system is coupled in stormwater communication with the hydrocarbon filter; and
the fine particle filter is coupled in stormwater communication with the media filtration system, and the dry well.

38. The stormwater collection, treatment, and aquifer replenishment installation according to claim 31, further comprising:
an aboveground sidewalk for pedestrians built along the side of the impervious surface; and
each of the tanks defines a part of the sidewalk.

39. The stormwater collection, treatment, and aquifer replenishment installation according to claim 38, wherein each of the tanks further comprises:
at least one manhole to within the tank through the part of the sidewalk; and
a manhole cover movable between a closed position to close the at least one manhole and an open position to open the at least one manhole.

40. The stormwater collection, treatment, and aquifer replenishment installation according to claim 31, wherein each said tank is formed of a material having rigid and load-bearing material characteristics.

41. The stormwater collection, treatment, and aquifer replenishment installation according to claim 40, wherein the material comprises at least one of reinforced concrete, cast iron, steel, and polymer plastic.

* * * * *